United States Patent
Sylvester

(10) Patent No.: US 7,611,130 B2
(45) Date of Patent: Nov. 3, 2009

(54) ADJUSTABLE CYCLE TIMER CONTROL FOR AERATORS

(76) Inventor: Jeffrey S. Sylvester, 10352 Englewood Dr., Eden Prairie, MN (US) 55347

( * ) Notice: Subject to any disclaimer, the term of this patent is extended or adjusted under 35 U.S.C. 154(b) by 154 days.

(21) Appl. No.: 11/985,433

(22) Filed: Nov. 15, 2007

(65) Prior Publication Data

US 2008/0112817 A1    May 15, 2008

Related U.S. Application Data

(60) Provisional application No. 60/859,065, filed on Nov. 15, 2006.

(51) Int. Cl.
*B01F 3/04* (2006.01)
(52) U.S. Cl. ............ 261/26; 43/56; 43/57; 119/201; 261/115; 261/119.1; 261/121.2
(58) Field of Classification Search .......... 261/26, 261/115, 119.1, 121.2; 43/56, 57; 119/201; 210/143; 417/36, 44.1, 44.11
See application file for complete search history.

(56) References Cited

U.S. PATENT DOCUMENTS

| | | | | | |
|---|---|---|---|---|---|
| 1,109,193 | A | * | 9/1914 | Zistel | 119/203 |
| 2,970,401 | A | * | 2/1961 | Hays | 43/57 |
| 3,323,249 | A | * | 6/1967 | Randall | 43/57 |
| 3,815,277 | A | * | 6/1974 | Murray | 43/57 |
| 4,677,785 | A | * | 7/1987 | Lambourn | 43/55 |
| 4,970,982 | A | * | 11/1990 | Martin | 114/255 |
| 5,822,916 | A | * | 10/1998 | Power | 43/57 |
| 5,996,977 | A | * | 12/1999 | Burgess | 261/140.1 |
| 7,140,600 | B1 | * | 11/2006 | Wry | 261/121.2 |
| 2007/0022966 | A1 | * | 2/2007 | Torring et al. | 119/201 |

FOREIGN PATENT DOCUMENTS

GB    2194121 A  *  3/1988    ............. 119/201

* cited by examiner

*Primary Examiner*—Richard L Chiesa
(74) *Attorney, Agent, or Firm*—Kinney & Lange, P.A.

(57) ABSTRACT

A liquid container aeration system for replenishing gases dissolved in a selected liquid present in an interior of said liquid container that checks on an electrical power source capability to continue operation and allows selected liquid substitution in the interior of the container.

13 Claims, 10 Drawing Sheets

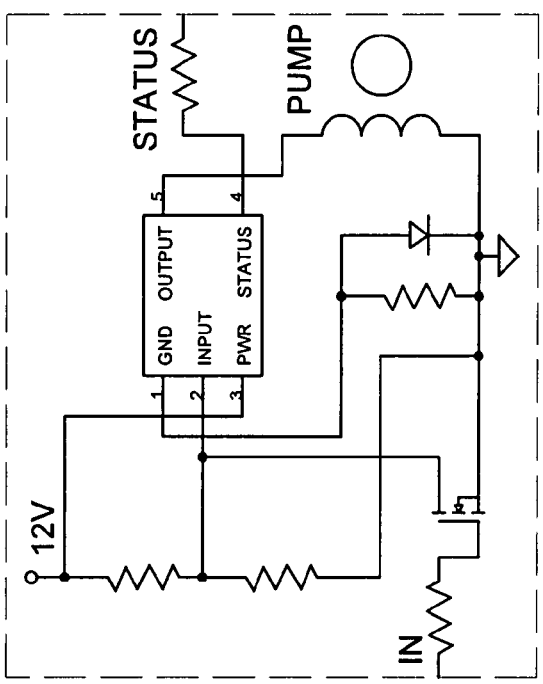
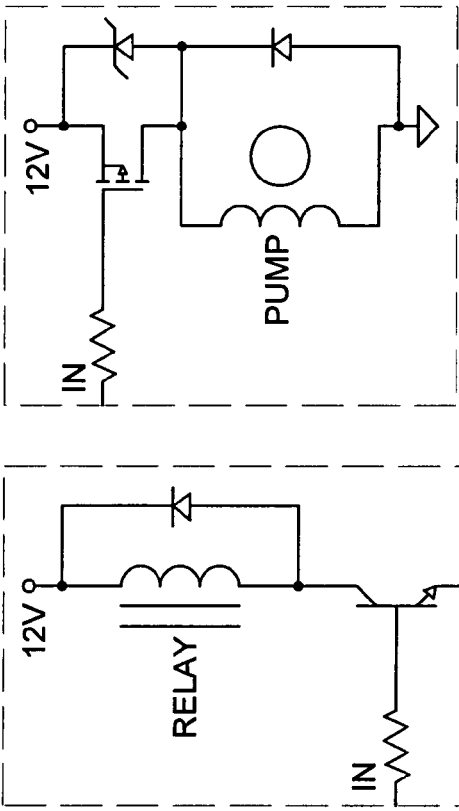
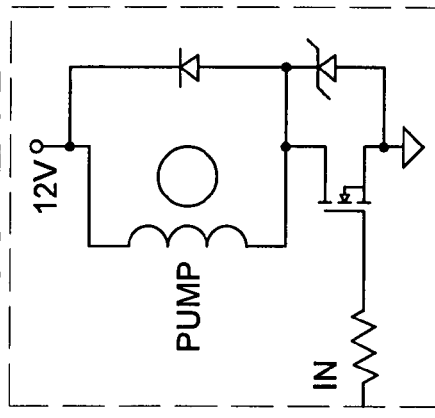
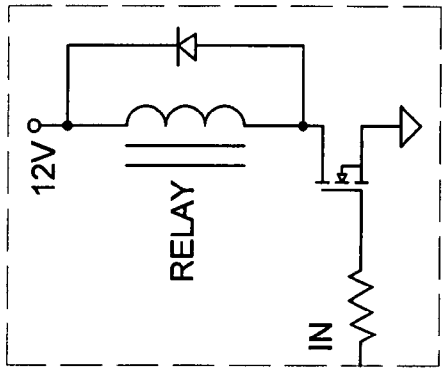
FIGURE 7A
FIGURE 7B
FIGURE 7C
FIGURE 7D
FIGURE 7E
FIGURE 7F

US 7,611,130 B2

ADJUSTABLE CYCLE TIMER CONTROL FOR AERATORS

CROSS-REFERENCE TO RELATED APPLICATION

This application claims the benefit of Provisional Patent Application No. 60/859,065 filed Nov. 15, 2006 for ADJUSTABLE CYCLE TIMER CONTROL FOR AERATORS.

BACKGROUND

The present invention relates to controllers for water aeration systems and, more particularly, to such apparatus for use in recreational boats, or other watercraft, or other transportation vehicles, including automobiles, wherein livewells, baitwell, or similar aquatic wildlife holding tanks are contained needing aeration to increase the oxygen content and other qualities of the water held therein.

Conventional livewells and baitwells are commonly provided in modern watercraft, such as boats, or in other vehicles, all of which are typically also fitted with electric power batteries, and corresponding battery charging systems, or other electric power sources. Such sources are often then used to provide electrically powered water pumps for selectively filling the tanks contained in such livewells and baitwells with water from an adjacent source of water such as the ambient body of water in which a boat or watercraft is being operated. These tanks typically also contain an overflow discharge line to establish a maximum depth of water in those tanks and so prevent overfilling thereof beyond such a depth.

More sophisticated holding tanks in some watercraft and some land use vehicles are also provided with a pump operated recirculation aeration system therein for withdrawing water from within the tank that is pumped to a spraybar through which pressurized water jets are sprayed from openings therein across some portion of the atmosphere into, and so returned to, the tank through having such spraying directed back into the tank. This spraying serves to replenish the oxygen in the tank water that is otherwise being consumed therefrom by the aquatic vertebrates and invertebrates that are being kept in the water in the tank.

The quality of water contained in such livewells, baitwells, aquariums and other such holding tanks, can be affected by many different conditions. These include the quality and size of aquatic wildlife contained therein, the excited nature of this aquatic wildlife, the ambient temperature of the water held within each holding tank, and the existence of water contaminants contained therein. Thus, in typical operation, a tank aeration system is periodically operated to discharge water through the overflow discharge line to carry with it fish scales, slime secretions, and aquatic wildlife waste all of which are usually expelled by aquatic wildlife in their normally excited state that typically results from their being placed in a holding tank. Other water contaminants are also often brought in to the tanks through the water pump drawing in water from a source in which such contaminants occur, such as a lake, which contaminants can also be subsequently discharged through the tank overflow line apparatus.

An electronic controller device is typically provided to actuate, for selected times, tank water aeration systems powered by a vehicle battery. Livewell and baitwell aeration systems presently available typically use a manual switch to turn the aeration systems on and off.

Most frequently, the livewell pump is simply left on constantly by the user, and the only form of operational control is for the operator to turn it on and off manually. Leaving the pump on continuously can rapidly drain the battery that runs the pump. This is a particularly serious problem for offshore fishermen in boats who may use the storage battery that is provided in the boat for both starting the boat engine and for supplying electrical power to operate this pump. This means the operator must use care to remember to not discharge the battery to the point where the engine cannot be restarted, or else must idle the engine to keep the battery charged. Idling the engine not only consumes gasoline, but also may disturb the fishing in the area of the boat.

Alternatively, a common practice is to use some kind of adjustable timing device which can periodically activate the aeration system according to a user selectable time setting. However, such devices are often limited in the operation timing control selections they offer. Operators often forget that the livewell has been kept on, leaving battery too close to charge depletion to be capable of restarting the vehicle engine thereby resulting in a stranded user situation. In addition, there are many possible situations in which users want to operate the aerators when watercraft or other vehicles containing them have the vehicle propulsion engine off.

Different species of aquatic wildlife require different levels of water quality in the livewell or baitwell to survive well therein. Some particular species of minnows are very sensitive to poor water quality and require frequent replenishment, whereas other species are quite hardy, and will survive well with infrequent aeration and/or replenishment of the water in the holding tank. Thus, an automatic control system for aerators that will control the aeration so as to maintain water quality in livewells and baitwells in the various conditions than currently encountered is needed that also makes the efficient use of the vehicle battery.

SUMMARY

The present invention provides a liquid container aeration system for replenishing gases dissolved in a selected liquid present in an interior of said liquid container and has an electrically energized liquid pump having an input selectively positionable in a reservoir liquid contained in a selected reservoir similar to the selected liquid and having an output selectively positionable adjacent the interior with the liquid pump being switchable by pump control signals at a pump controller therein between being maintained in a pumping state in which it is capable of pumping a liquid at its input through its output, if electrical power is supplied from an electrical power source to a pump electrode therein, and a quiescent state in which it is incapable of pumping a liquid at its input through its output. An electrical power consumption detector is electrically connected in series with the pump electrode and is capable of determining whether the liquid pump is drawing electrical power through the pump electrode and of providing a power draw detection signal indicating same at a detector output thereof. A system controller electrically connected to the pump controller and the detector output and capable of determining from said power draw detection signal whether an electrical power source connected in series with the electrical power consumption detector and the pump electrode is in a condition suited to continue supplying electrical power to the liquid pump. An electrically energized drain liquid pump can also be provided having an input selectively positionable adjacent said interior and having an output selectively positionable adjacent a drain reservoir with the drain liquid pump being switchable by pump control signals at a drain pump controller therein between being maintained in a pumping state in which it is capable of pumping a liquid at its input through its output, if electrical power is supplied from an electrical power source to a pump electrode therein, and a quiescent state in which it is incapable of pumping a liquid at its input through its output. The system controller is electrically connected also to the drain pump controller and capable of acting on a command received thereby to direct the injection liquid pump and the drain liquid pump to each be maintained in the pumping state thereof sufficiently to substitute, for a selected fraction of the selected liquid initially present in the interior of the liquid container with the reservoir liquid sufficient for this reservoir liquid and that remaining selected liquid in the interior of the liquid container together provide liquid in the interior of the liquid container to a selected depth.

DETAILED DESCRIPTION

Figure 1:
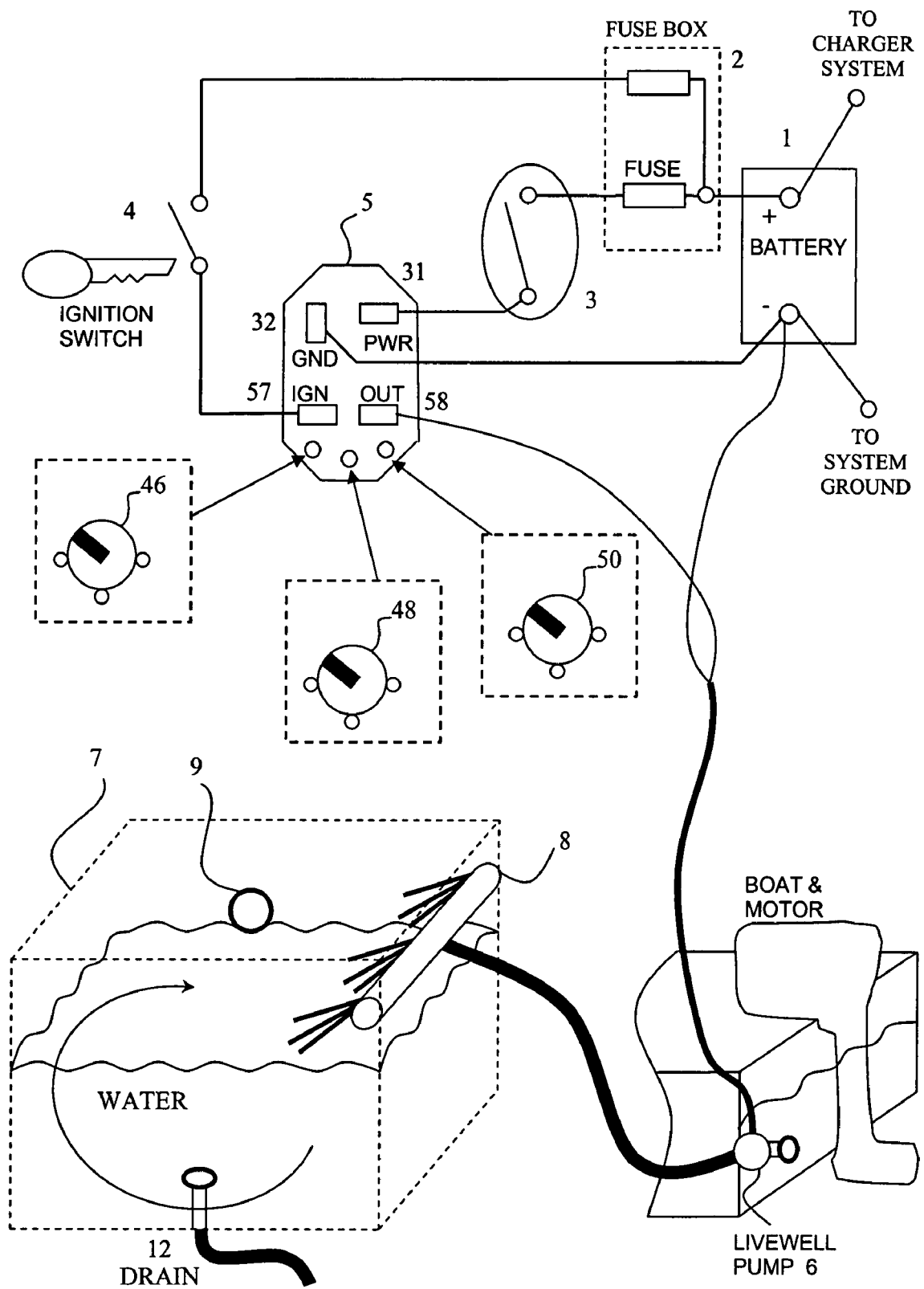
FIG. 1 shows a system electrical components interconnection diagram of an embodiment of the present invention.

The electromechanical aeration system shown in part in FIG. 1 obtains electrical power from a typical 12 Volt electrochemical battery, 1. Electrical power is supplied therefrom first to a remotely mounted fuse box, 2, that provides protection against excessive current draws in the event of some system failure leading to a short circuit somewhere in that system.

The electrical power available from battery 1 through fuse box 2 is selectively provided to other portions of the system through a remotely mounted manual rocker power switch, 3, and through a remotely mounted ignition switch, 4. When rocker switch 3 is switched on, electrical power is supplied to a remotely mounted connector and selector arrangement, 5, in the aeration system of FIG. 1 with this power being provided between a positive voltage power terminal, 31, and a system ground terminal, 32. This power is used to operate the aeration system of FIG. 1 as a livewell or baitwell aeration system provided in a suitable vehicle. This aeration system has an electrical control system therein that is represented in the electrical circuit and system schematic diagram shown in FIG. 4 with terminals shown therein corresponding to connectors provided in remote connector arrangement 5 and to a connector for a corresponding livewell tank filling and aerating pump, 6, having its other side grounded at battery 1. This pump is indicated in FIG. 1 to be used as a part of the aeration system to draw water from a source, such as a lake in the instance of the vehicle being a boat, and to direct it into a livewell tank, 7, provided in the vehicle through a spraybar, 8, with this pump being under the control of the remaining aeration system portions shown in FIGS. 1 and 4. Livewell tank 7 is provided with an overflow outlet, 9, and a manually operated drain, 12.

Figure 4:
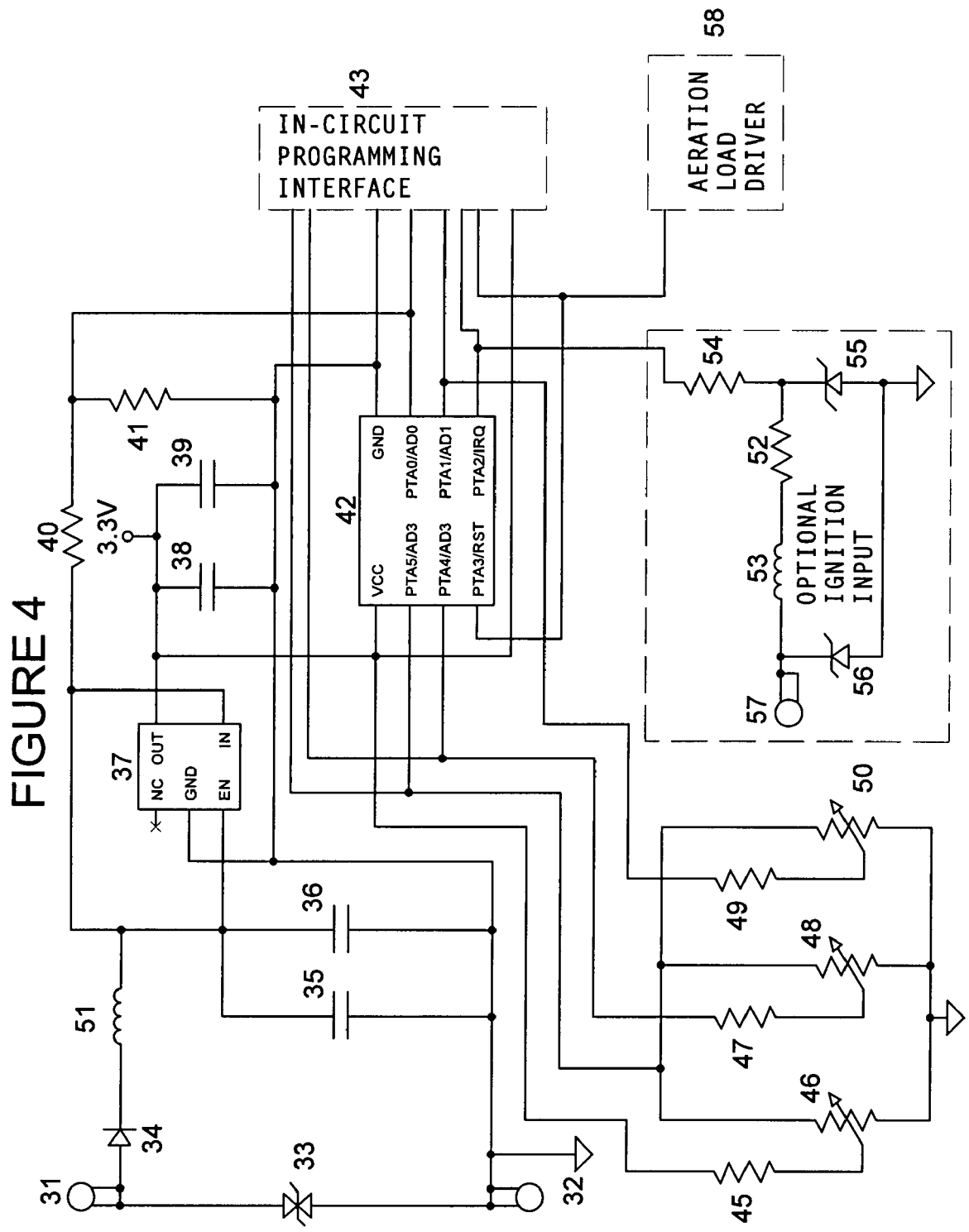
FIG. 4 shows a schematic circuit and system diagram of the system of FIG. 1.

Thus, rocker switch 3 is operated by the user to switch on and off the aeration system of FIG. 4, including the electrical load of fill and aeration pump 6, but this pump load can be further controlled in being switched on and off by the aeration system of FIG. 4 without direct action by the system user, when switch 3 is switched on, for time durations that are previously chosen within certain limits by the user through the user interacting with the aeration system of FIG. 4. When rocker switch 3 is switched off, electrical power is removed from the aeration system so that this system is then inactivated.

The switching on and off of ignition switch 4 controls other systems in the vehicle, typically including the vehicle locomotion engine, and also supplies a very small amount of electrical power to the aeration system represented in FIG. 4 when that switch is on whether or not rocker switch 3 is switched on. This electrical power supplied through ignition switch 4 is used to no more than form a "battery being charged" signal to the aeration system at a terminal, 57, in arrangement 5 in FIG. 1 because the ignition switch being switched on, with a battery voltage sensed by the aeration system as being over 13.2 volts, implies that the vehicle engine is being operated, and this condition also means that an electrical generator directly operated by that engine is charging battery 1.

With rocker switch 3 switched on to establish a voltage of nominally 12 Volts between terminals 31 and 32 in FIG. 4, cathode-to-cathode zener diodes, or transient voltage suppressor (TVS), 33, clamps any excessive power supply voltage spikes, and any electrostatic discharges, that can occur between power terminals 31 and, 32 to tolerable, nondestructive maximum voltage values, to result in a voltage supply between those terminals suitable for use by the aeration system represented in that figure. These voltage spikes, when they occur, are typically due to inductive load kickback from the engine starter motor and other various inductive loads such as pumps, motors, solenoids, actuators and other such devices, connected to the system power supply therein.

The 12 Volts from the electrical power supply at terminals 31 and 32 is applied across a diode, 34, a ferrite bead inductor, 51, and a pair of capacitors, 35 and 36. Diode 34 prevents destructive current flow in the event the terminals of battery 1 are accidentally connected in reverse from what is shown in FIG. 1, or in the event the user accidentally connects the aeration system represented in FIG. 4 at terminals 31 and 32 in reverse to terminals 31 and 32 in FIG. 1 rather than matching terminals 31 in each to one another, and similarly for terminals 32. The electrical voltage at terminals 31 and 32, applied across ferrite bead 51 and paralleled capacitors 35 and 36, charges those capacitors to 12 Volts. Ferrite bead 51 blocks any high frequency noise present at those terminals. Any such high frequency noise conducted down the power supply wiring from other electronic devices directly connected to, or in close vicinity of, the power supply and the system is filtered out by the combination of bead 51 and high frequency capacitor 35. High frequency noise comes from directly connected, magnetic coupled, or radiated/transmitted signals through the air, or from other electronic devices contained in the vehicle in which the system of FIGS. 1 and 4 is provided.

This noise filtered voltage also charges capacitor 36 that is in parallel with capacitor 35 which has a large capacitance value relative to capacitor 35 for storing sufficient charge to provide transient current requirements and the stabilized 12 Volts needed between terminals IN and GND of a commercially available voltage regulator integrated circuit chip, 37. Voltage regular 37 steps down and converts the capacitor 36 voltage to a stable, constant voltage value of 3.3 Volts at terminal OUT thereof which is provided as the electrical power source to operate a commercially available appropriate microcontroller integrated circuit chip, 42. The 3.3 Volts from voltage regulator 37 is provided to the VCC and GND terminals of microcontroller 42, and across a pair of capacitors, 38 and 39, connected in parallel with one another across these same microcontroller terminals. Capacitor 38 provides a stabilized regulated voltage, by filtering out transient currents that occur thereacross, to microcontroller 42 and aids in stabilizing the internal control loop of voltage regulator 37. Capacitor 39 serves as a low impedance bypass capacitor to shunt high frequency noise to ground that is typically generated by other electronic devices contained on the circuit board housing the aeration system of FIG. 4. The stabilized voltage across capacitor 38 is also provided to support supplying transient electrical currents for devices involved with switchings of the logic states at the input/output (I/O) ports of microcontroller 42.

Figure 9:
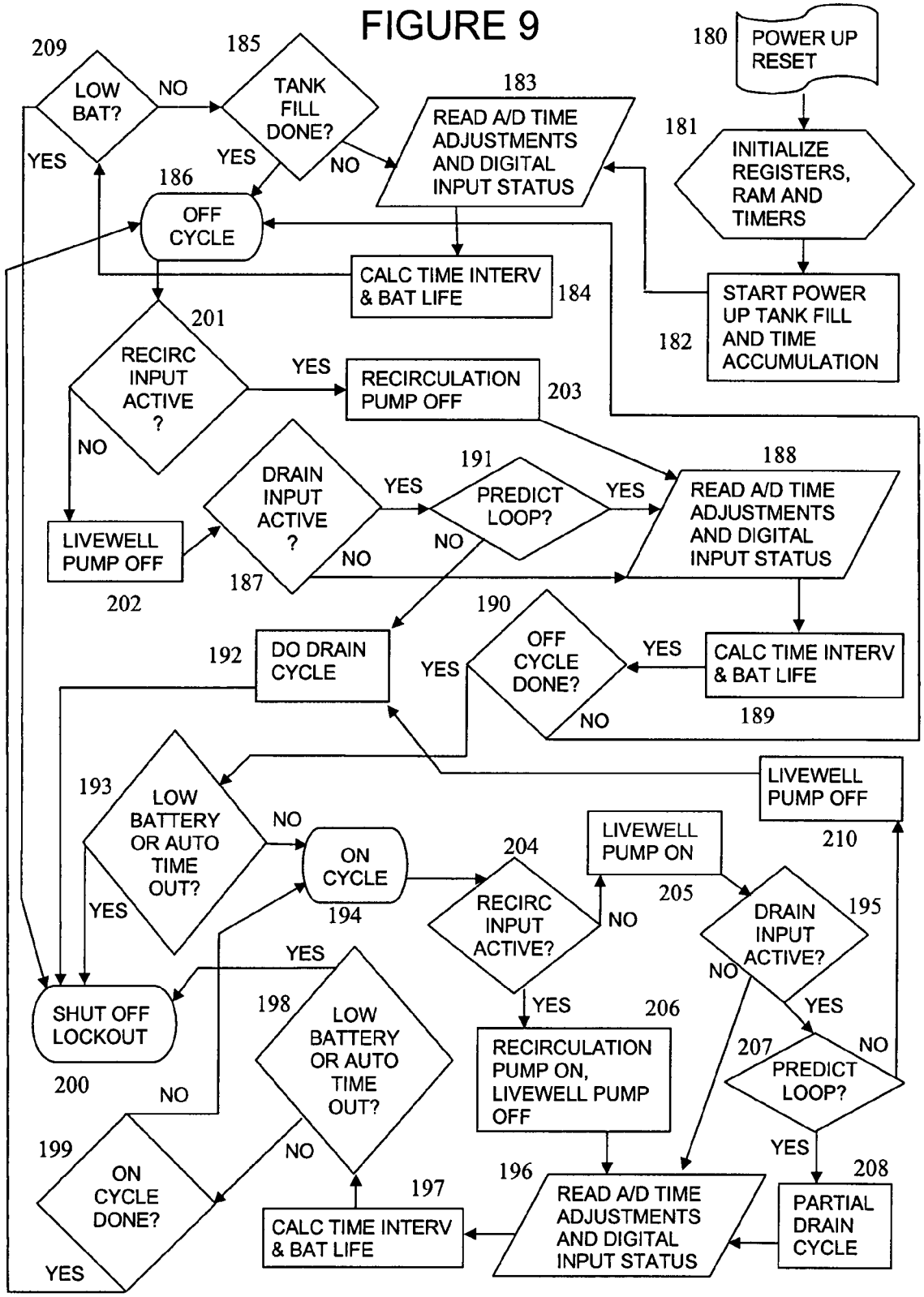
FIG. 9 shows a flow chart of system controller operations.

When the microcontroller 42 (micro) first receives electrical power from voltage regulator 37 and capacitors 38 and 39 after the switching on of rocker switch 3, a power-up reset of the microcontroller is performed in a starting process therefor, 180, as indicated in the flow chart of FIG. 9 describing the operations performed in and by the micro. The micro in an initial reset operation therein delays any operations of others of its internal circuits until its internal oscillator circuit stabilizes in frequency, and then proceeds to initialize its internal registers, memory, time base, and timer initializations in a process, 181, of the flow chart in FIG. 9. The micro then acts to enter a further process, 182, in that chart to begin accumulating timing pulses in a timer register in the micro that uses a counter therein to count pulses at a frequency based on a lower pre-scaled frequency of pulses provided by a time base oscillator, in such a manner as to divide the original time base oscillator frequency by a constant number, and use this as the basis to measure an aeration system tank filling operation time duration to be described below.

Concurrently with the start of tank filling operation time duration measurement, the micro in process 182 also provides a logic level control signal to actuate a pump 6 through operating circuit, 58, indicated in a block in FIG. 4 such as one of those shown in FIGS. 7A to 7F in which this control signal is provided as the signal at the "IN" terminal in the circuits of those figures. The power supply terminal marked "12 V" in the circuits of those figures is connected to the aeration system side of rocker power switch 3 at terminal 31 to have 12 Volts from battery 1 supplied thereto. The circuits in FIGS. 7E and 7F each have protective voltage switching chips shown as five terminal devices therein, and the terminal marked "STATUS" in these circuits is connected to the micro to provide the circuit switching information like over temperature, open load, or short circuit load. Pump operating circuit 58, as one of the circuits in FIG. 7, along with pump 6 form the fill and aeration pump 6 electrical load in the aeration system of FIGS. 1 and 4, but operating circuit 58 could be some other circuit alternative to those shown in FIG. 7 that is also useable as such a pump operating circuit.

Pump operating circuit 58, when actuated, switches on aeration pump 6 of FIG. 1 to thereby begin to perform a tank fill cycle to fill livewell tank 7 through the aeration system operating this pump for a predetermined fixed duration of time as described below. This switching on of aeration pump 6 results in that pump filling this livewell tank to a depth limited by overflow discharge outlet 9.

For operating in this manner for a fixed duration of time, the micro next enters a further process, 183, of the flow chart in FIG. 9 to detect the values the system user has entered as time duration selections which result in corresponding analog voltage inputs to the micro from user adjustable potentiometers and optionally also detecting the input status at terminal 57 of the ignition switch 4 in FIG. 1 just as a confirmation of the following battery voltage measurement indication for determining whether the battery is being charged. If such confirmation is to be omitted, terminal 57 and the associated circuitry can also be omitted. The system battery voltage is read as an analog voltage presented to the micro through a series connected voltage divider network comprising of resistors 40 and 41, connected across battery supply terminals 31 and 32, yielding the value of the battery voltage minus a diode drop of 0.7 volts across diode 34, with the output voltage of the divider at the junction of these resistors being input to micro input PAT0 pin.

The status of ignition switch 4 is determined by whether or not the 12 Volt ignition switch transmitted electrical power is present at terminal 57, as indicated in FIG. 1, and so whether or not that voltage is present at that same terminal 57 also shown in the aeration system represented in FIG. 4. Any voltage surge spikes from other inductive couplings into the ignition switch circuit are clamped to a tolerable level by TVS 56. The 12 V from battery 1 providing the electrical power supply at terminals 57 and 32 is applied across a ferrite bead, 53, a resistor, 52, and a zener diode, 55, with ferrite bead 53 blocking any high frequency noise appearing on the ignition switch line whether due to conducted or radiated electromagnetic interference (EMI), or both, that can come from other electronic devices directly connected to or in close vicinity to the ignition switch line circuitry. The 12 Volts at those terminals is stepped down to a 3 Volt value by resistor 52 and zener diode 55. Resistor 52 limits the current available to zener diode 55 so that it does not overheat and breakdown to thereby become a failed part. Zener diode 55 provides a constant 3 volt signal which is detectable by the micro at input PTA2/IRQ thereof. This 3 Volt signal is provided to the micro through resistor 54 which limits the current flow into the micro 42, and forces the current through TVS 56, in the event of a transient on ground terminal 32 due to ESD or EMI entering somewhere in that terminal arrangement. Depending on the characteristics of micro 42 I/O ports and the electrical characteristics of TVS 56, in some instances resistor 54 may not be needed and can be omitted.

There are three independently selectable operation time durations, designated On Time, Off Time, and Auto-shut off Time, which can be established as system operation time bases that can be used to begin and end corresponding aeration system events in the aeration system represented in FIGS. 1 and 4. These three time periods are established with selected duration values therefor by the user of the aeration system through that user selecting in remotely mounted connector and selector arrangement 5 of FIG. 1 the wiper blade positions of potentiometers 46, 48 and 50 connected in parallel across the output of voltage regulator 37 with capacitors 38 and 39 in FIG. 4. This provides corresponding wiper blade analog voltage representations of the blade positions to the micro which can detect such analog voltages at corresponding I/O ports thereof.

On Time is the first user adjustable independent time cycle defined as switching on, or actuating, aeration system pump 6 through operating circuit 58 to activate pump 6 for a selected time period during which water is pumped through spraybar 8 into livewell 7 in such a way as to add new water into that tank, in an effort to oxygenate the water therein, while at the same time expelling the contaminated water through water discharge outlet 9. Alternatively, rather than using a pump and spraybar to provide substitute water in tank 7 through the spraybar for oxygenation purposes, an electrolytic cell can be selectively operated, in addition to pump 6 as the initial tank filling pump, to provide oxygen in the tank water. Such a cell arrangement oxygenates the tank water by electrically attracting disassociated ions in the tank water moving therethrough, serving as the cell water based electrolyte, to a cathode where hydrogen bubbles form and escape and to an anode where oxygen bubbles form that stay suspended in the tank water.

Off Time is a second user adjustable independent time cycle defined as switching off, or deactivating, the aeration system pump 6 and its operating circuit 58 (or the electrolytic cell) for a user selected time. This has the effect of preserving whatever electrical charge is left in system battery 1 to thereby enable a longer total time over which sufficient life preserving aeration can be provided on a single battery charging or recharging.

Auto-shut off Time is the third user adjustable independent time cycle that allows the operator to select the total time of aeration system operation following each instance of battery 1 not being charged because of either vehicle ignition switch 4 having been switched off or, for some other reason, not being charged as indicated by the voltage of battery 1 being measured as being somewhat too low. The application of this setting is to automatically turn off the aeration load in case the user has forgotten to turn off the controlling device. During the time duration of this cycle, consecutive "on" cycles and "off" cycles of pump 6 and its operating circuit 58 are directed to be performed by the micro to thereby correspondingly periodically add and discharge water from the livewell tank, a cycling which terminates when the Auto-shut off time duration value is reached following a battery voltage measurement indicating that no charging has been occurring for that duration. At the end of that time duration any further operation of the aeration system of FIG. 4 is prevented including the supplying of any electrical power to pump 6 and its operating circuit 58 until rocker switch 3 is next switched off and then on again.

In accomplishing the establishment of these system operation time durations for an operating episode of the aeration system in FIGS. 1 and 4, the user adjusts positions of the wiper blades in potentiometers (pots) 46, 48, 50 anywhere from 0 to the maximum of 3.3 Volts (that is available across the pots from the output of voltage regulator 37 and capacitors 38 and 39) by rotating the pot wiper blade mechanical position control knob to select the desired individual time durations for the On Time, for the Off Time, and for the Auto-shut off Time. The corresponding wiper blade analog voltages for each blade position setting, as wiper blade position signals, are detected by the micro at the corresponding I/O ports thereof from where each is converted in the micro into a corresponding stored digital value representing the desired duration for each of the corresponding system operation time bases.

Pot 46 is used to select the duration for the On Time and the wiper blade voltage therefrom is connected through resistor 45 to terminal PTA5/AD3 of the micro. Pot 48 is used to select the duration for the Off Time and the wiper blade voltage therefrom is connected through resistor 47 to terminal PTA4/AD3 of the micro. Finally, pot 50 is used to select the duration for the Auto-shut off Time and the wiper blade voltage therefrom is connected through resistor 49 to terminal PTA1/AD1 of the micro. Resistors 45, 47 and 49 provide current limiting to prevent latchup of the corresponding I/O port of the micro due to noise spikes resulting from the switchings of electronic loads connected to the battery or to the aeration system represented in FIGS. 1 and 4. In the event that an individual wiper arm position is adjusted all the way to ground (0 Volts), or alternatively, all the way to the pot operating voltage (3.3 Volts), the current resulting in the I/O ports is limited to a value small enough not to cause port latchup.

Following the micro acquiring the values of a) the pot blade wiper position signals for pots 46, 48, and 50, b) the then current value of the voltage being supplied by battery 1, and c) the ignition switch 4 status signal in process 183 of FIG. 9, these data acquisitions having all followed process 182 in which the micro previously started pump 6 through its operating circuit 58 and started the associated accumulation timer, the micro goes on to enter another process, 184, of FIG. 9. There, the micro calculates the charge remaining in battery 1 using an estimation procedure based on known battery discharge characteristics, as further described below, and also calculates those time durations desired by the user for the On Time, Off Time and Auto-shut off Time based on the corresponding stored digital values therefor from the wiper blade positions of pots 46, 48 and 50. These time durations are obtained by determining the corresponding proper count accumulations therefor in view of the counted pulses at a frequency derived from the time base oscillator.

The charge remaining in battery 1 is determined, in one of the possible methods for making such determinations, by the micro detecting the value of the voltage at the junction of resistors 40 and 41 during an On cycle with its corresponding time since system power up being stored. These values form a first set of battery voltage data points. A similar second set of battery voltage data points is again detected in the subsequent On cycles after which at least one Off cycle has occurred or at some other predetermined time perhaps even during the same On Cycle if a periodic measurement process is used with a sufficiently short time period. The quadratic equation $v=at^2+bt+c$ or the linear equation $v=mt+b$ (v=voltage, t=time) is used to calculate the slope between sets of consecutive data points over the time difference between the two times of detection. The choice between use of these linear and quadratic equations for approximating the discharge characteristic of battery 1 depends on the type of battery being used and the time that has elapsed between measurements being taken with shorter times leading to using the linear equation.

The total battery load current can be extrapolated by comparing the calculated slope of the voltage data points and to the slope of manufacturer supplied battery discharge curves in which batteries of this same kind are discharged using a load of specific impedance so as to completely discharge the battery in a set period of time as based from the battery manufacturers Amp hour rating. For instance, a 50 Amp hour battery connected to a 2 amp load will run for 25 hours. The remaining battery State Of Charge (SOC) can now be calculated, in one method for such a determination, by using Peukert's equation and the estimated current from the load current extrapolation described above, and using the known discharge time as recorded in the voltage measurements taken. Peukert's equation is $C=I^nT$ where C is the theoretical capacity of the battery, I is the load current found, T is time, and n is the Peukert number, a constant previously determined for a given battery chemistry.

When the value of the voltage at the junction of resistors 40 and 41 reaches a particular threshold, battery 1 is assumed to be charging since direct current measurement is not possible because the micro is not in series with the charging device, and is often physically located several feet away from the system battery. However, the state of charge of battery 1 can still be calculated where an estimated charge based on known battery charging curves of voltage vs. time for a given charging load can be added back to thus recognize that an increase in the overall state of charge of the battery has occurred. In the same manner that the battery discharge was calculated above, the battery charge can calculated following a charging thereof having been detected. A first measurement of voltage and time is made to form a first data set and, at a predetermined time duration later, a second measurement of voltage and time is made to form a second data. The quadratic equation $v=at^2+bt+c$ or the linear equation $v=mt+b$ (v=voltage, t=t time) is used to calculate the slope between sets of consecutive voltage data points over the time difference between the two times of measurement.

The choice between use of these linear and quadratic equations for approximating the discharge characteristic of battery 1 again depends on the type of battery being used and the time duration between measurements taken. The ratio of the change in voltage between measurements to the difference in measurement times is compared to a charging curve to extrapolate the charging current, and since time duration is also known, the charge being added back to the battery is again calculated using Puerkert's equation $C=I^nT$.

After these calculations are complete, the micro enters a decision diamond 209, in FIG. 9 to determine if battery 1 has sufficient energy stored therein as calculated in process 184. If the stored energy of battery 1 is determined to be too low, the micro proceeds to shut off aeration system pump load of pump 6 and operating circuit 58 currently performing a tank fill cycle and enters a termination process, 200, where this aeration system pump load is disabled and no more On cycles can occur until power switch 3 is switched off by the user and the system subsequently restarted by the user again closing switch 3.

If a low battery condition was not present in decision 209, the micro then proceeds to a decision diamond, 185, where it checks, by performing a comparison, on whether the counter for the tank fill accumulation timer has reached an accumulated count matching the previously determined accumulation count provided, as indicated above, corresponding to the water in the livewell tank having reached the desired depth typically at the overflow outlet 9 level, that is, whether the tank fill up time duration has expired. If fill up time duration has not expired, the micro keeps the aeration system pump load of pump 6 and its operating circuit 58 activated and then loops back to again perform processes 183 and 184 to repeat acquiring the pot blade wiper position inputs, while also again measuring the voltage being supplied by battery 1, along with the ignition switch 4 status input. The micro then recalculates the corresponding time durations to update these durations because of the possibility that the user has changed the pot wiper blade position settings in the interim, i.e. changed the any of the various desired system operation time durations, and again compares the tank fill accumulation timer has reached an accumulated count matching the previously determined accumulation count provided. The micro continues in this loop until tank fill up time has expired at which time the micro enters an Off cycle initiation process, 186, in FIG. 9.

The micro thereafter begins the Off cycle by proceeding to a decision diamond, 201, in FIG. 9 concerning operation of a tank recirculation arrangement which is not present in the aeration system configuration of FIG. 4 (but which will be described below for an alternate configuration), and so skips through this diamond in this FIG. 4 configuration to a further process, 202, to switch off electrical power to, or deactivate, pump operating circuit 58 to thereby stop any further pumping by aeration pump 6 of water into livewell tank 7, and so also end the drain on the charge left in battery 1 that results from such pumping. The micro continues by proceeding to a decision diamond, 187, in FIG. 9 concerning operation of a tank drain arrangement which is not present in the aeration system configuration of FIG. 4 (but which will be described below for an alternate configuration), and so skips through this diamond in this FIG. 4 configuration to a further micro input process, 188, in that figure. There, the micro again acquires the input signals from pots 46, 48 and 50, as well as the input indicating the status of ignition switch 4, and again measures the voltage being supplied by battery 1. The micro then enters a further evaluation process, 189, to recalculate the operation time durations in the manner previously described above in connection with micro processes 183 and 184 to update them on the possibility of the user interactive inputs having been changed.

The micro then proceeds to a further decision diamond, 190, to compare whether the timer register count accumulation value of the counter corresponding to the Off Time matches the count set for the Off Time, last calculated in process 189 based on the wiper position then of pot 48, as the basis for determining whether Off cycle process time duration has expired and so is to end. If the Off cycle process counter has not reached the Off Time count value so that the Off cycle process Off Time duration has not expired, the micro loops back to the Off cycle initiation point in block 186 again and again thereby repeatedly proceeding through the loop containing decision diamond 190 and micro performance process 202, input process 188 and evaluation process 189 (including the recirculation and drain processes based skips) to keep the aeration system pump load of pump 6 and its operating circuit 58 switched off and to undertake during each repetition the decisions and recalculations encountered therein until Off cycle process Off Time duration has expired.

The micro, once having determined in decision diamond 190 that the Off cycle has expired, thereafter proceeds to a decision diamond, 193, in which the micro determines whether the whole of the aeration system of FIGS. 1 and 4 is to be switched off by the micro until power switch 3 is opened and again closed by the user or, instead, an On cycle is to be entered absent an Auto shut-off condition or a low battery charge condition detected in decision diamond 193. In the On cycle, the aeration system pump load of pump 6 and its operating circuit 58 are to be switched on to thereby begin, or continue, having pump 6 cycled between alternately being switched on in an On cycle and being switched off in an Off cycle to correspondingly periodically add further water to livewell tank 7.

To make this determination, the micro first determines whether system conditions are present such that this cycling on and off of pump 6 should not be allowed, these conditions being termed Auto-shut off conditions. There are two such conditions, one being that a comparison showing that the timer count accumulation value of the counter corresponding to the Auto-shut off Time has reached a value sufficient to match the count selected in setting the Auto-shut off Time, i.e. has "timed out", since the last charging time of the battery. This duration was last calculated in process 189 based on the wiper position then of pot 50, indicating that the pump cycling time duration has expired (it could have been set to zero) and so that this cycling of pump 6 is either to not begin or is to end if it has previously begun. The other shut off condition to be detected in decision diamond 193 is the occurrence of the charge remaining in battery 1 being too low to allow system cycling operations to continue as determined in the manner previously described in connection with decision diamond 209.

If either of these shut off conditions is present, the micro proceeds in decision diamond 193 to Shut off process 200 in FIG. 9 where further operation of the aeration system of FIGS. 1 and 4 is prevented including any providing of any additional electrical power to the aeration system pump load of pump 6 and its operating circuit 58. The aeration system of FIGS. 1 and 4 is kept in this deactivated state until electrical power is removed from the system altogether by switching rocker power switch 3 open thereby terminating any activity in that system. If electrical power from battery 1 is removed from the aeration system of FIGS. 1 and 4 and then reapplied by switching open and then switching closed rocker power switch 3, the aeration system of FIG. 4 would then perform one livewell tank fill through the micro entering process 180 and continuing through to decision diamond 209, but the micro would then sense the low battery charge Auto-shut off condition and again enter Shutoff process 200 to prevent further operation of the aeration system in FIGS. 1 and 4.

If neither of the Auto-shut off conditions (corresponding counter timed out) or the low battery voltage condition checked for in decision diamond 193 is present, the micro proceeds to enter an On cycle initiation process, 194, to begin performing an On cycle which switches on, or actuates, pump operating circuit 58, and so pump 6, for the previously user selected On Time. Thus, the aeration system of FIGS. 1 and 4 in this cycle causes aeration pump 6 to pump further water to spraybar 8 where it is pressurized and sprayed in return, at a predefined angle, back into livewell tank 7 to produce convectional circulation of the water contained therein, thereby providing additional, better oxygenated water, to the aquatic wildlife being kept in the water provided within the livewell. In addition to this aeration, contaminated and less oxygenated water already present in livewell 7 is expelled through the tank water depth limiting overflow outlet 9. The micro thus proceeds to a further decision diamond, 204, again involving operation of a tank recirculation arrangement which is not present in the FIG. 4 configuration but will be described below in another configuration. The micro thus skips through decision diamond 204 to a further process block, 205, to switch pump operating circuit 58 and pump 6. After actuating pump 6 the micro goes on to another decision diamond, 195, in FIG. 9 again involving operation of a tank drain arrangement which is not present in this aeration system configuration, and so skips through this diamond to a further micro input process, 196, in that figure. There, the micro again acquires the input signals from pots 46, 48 and 50, as well as the input indicating as well as the status of ignition switch 4, and again measure the voltage being supplied by battery 1. The micro then enters an evaluation process, 197, to recalculate the operation time durations and recalculate the charge remaining on battery 1 in the manner previously described above in connection with micro processes 183 and 184 to update them on the possibility of the user interactive inputs having been changed.

The micro then proceeds to a further decision diamond, 198, to compare whether the counter count accumulation value of the counter corresponding to the Auto-shut off Time matches the count set for the Auto-shut off Time, last calculated in process 197 based on the wiper position then of pot 50, as the basis for determining whether Auto-shut off cycle process Auto-shut off Time duration has expired and so the On and Off cycling processes are to end, and also to check on the charge status of battery 1, i.e., check on the occurrence of either the Auto-shut off or low battery charge conditions. If either of these shut off conditions has occurred, the micro enters Shut off process 200 to prevent further operation of the aeration system in FIGS. 1 and 4, including any providing of any new electrical power to the aeration system pump load of pump 6 and its operating circuit 58, until electrical power is removed from the system altogether by switching rocker switch 3 open and subsequently provided again by the user closing that switch.

If neither of the shut off conditions has occurred as checked for in decision diamond 198, the micro proceeds to a further decision diamond, 199, to compare whether the counter count accumulation value of the counter corresponding to the On Time matches the count set for the On Time, last calculated in process 197 based on the wiper position then of pot 46, as the basis for determining whether On cycle process On Time duration has expired and so the On cycle process is to end. If the On cycle process counter has not reached the On Time count value so that the On cycle process On Time duration has not expired, the micro keeps the aeration system pump load including pump 6 switched on and loops back to the On cycle initiation point in block 194 again and thereby repeatedly going through the loop containing decision diamonds 198 and 199, micro performance process 205, input process 196 and evaluation process 197, (including the recirculation skip and the drain skip) to keep pump 6 and its operating circuit 58 actuated and to undertake during each repetition the decisions and recalculations encountered therein until the On cycle process On Time duration has expired.

If the On cycle process On Time has expired, the micro enters Off cycle initiation point 186 to switch off pump operating circuit 58 and also pump 6 and to begin again an Off cycle process looping repeatedly through the loop containing decision diamond 190 and micro processes 202, 188 and 189, making during each repetition the decisions and recalculations encountered therein until Off cycle process Off Time duration has expired. Then, again, at that time the micro proceeds to decision diamond 193 to again determine whether the whole of the aeration system of FIGS. 1 and 4 is to be switched off by the micro or, instead, the pump load including pump 6 and its operating circuit 58 is to be switched on to thereby continue having this pump cycled between being switched on and being switched off to correspondingly periodically add further water through pump 6 to livewell tank 7.

Thus, the aeration system of FIGS. 1 and 4 repeatedly loops between On and Off process cycles until either electrical power is removed therefrom by opening switch 3, or the system determines that either the Auto-shut off condition or the low battery charge condition has occurred. The occurrence of a shut off condition forces the micro into Shut off process 200 resulting in preventing any further operation of the aeration system of FIGS. 1 and 4 including any providing of additional electrical power to the aeration system pump load of pump 6 and its operating circuit 58 where it remains in this deactivated state until electrical power is removed from the system altogether by switching rocker switch 3 open. Opening rocker switch 3 whether the aeration system of FIGS. 1 and 4 is either operating actively or is deactivated immediately terminates any further activity in this system.

Figure 8B:
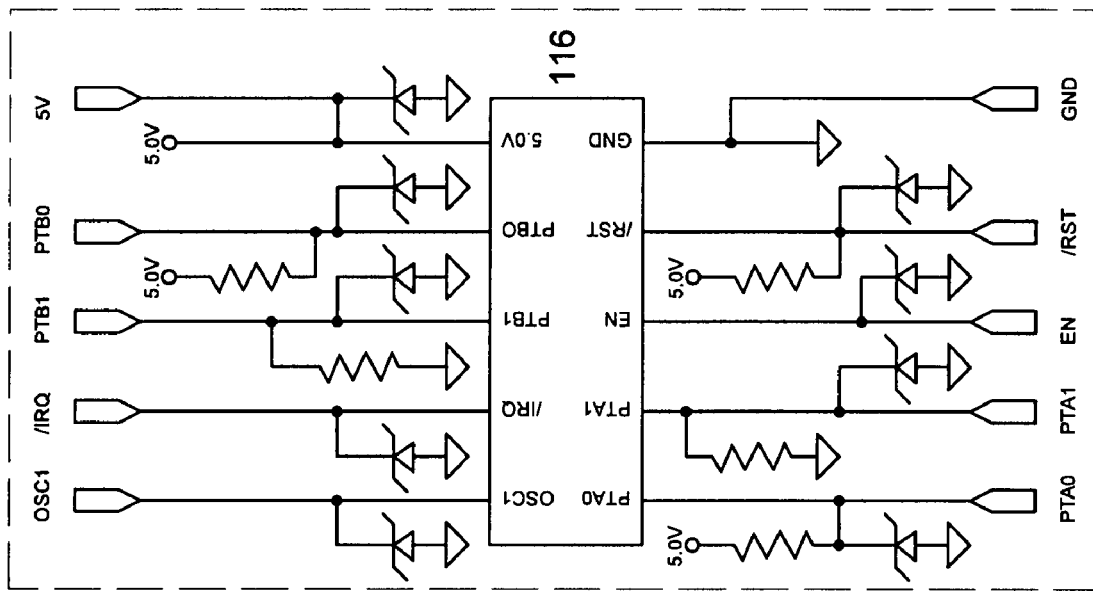
FIGS. 8A and 8B show schematic circuit diagrams of various supplemental system controller operating circuits.
Figure 8A:
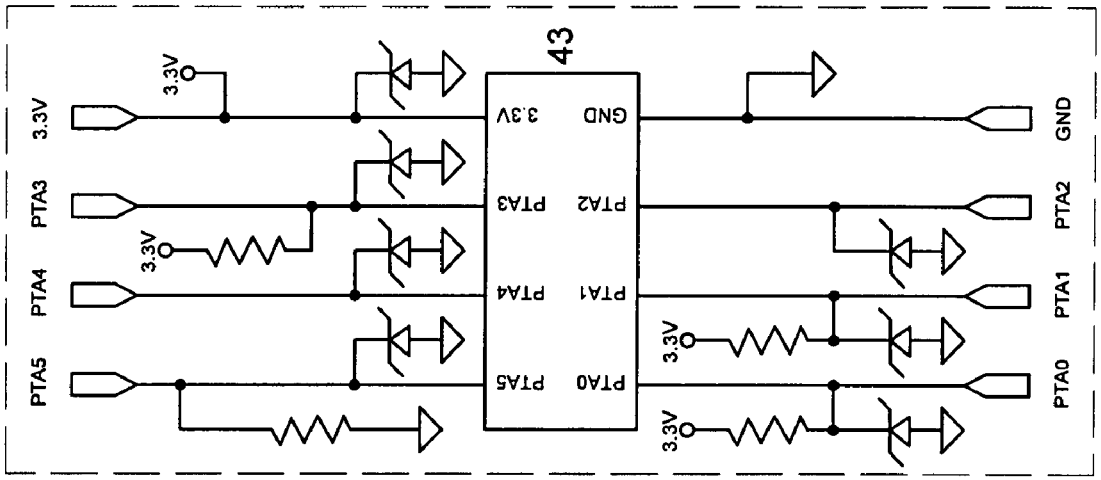

An in-circuit programming interface, 43, is shown in FIG. 4 as an optional added alternative that allows connecting to the aeration system of FIGS. 1 and 4 some additional circuit portions shown in FIG. 8A to enable in-circuit programming of the micro. These in-circuit programming arrangements allow certain external equipment to retrieve or reset the memory contents of the micro, or both. This allows the retrieving of field collected data such as error codes and also determining the revision of the micro primarily the computer program revision status. The circuits of FIG. 8A set the corresponding pins of the micro to a selected logic level to perform these operations on the micro. Parallel connected zener diodes are provided to prevent damage to the micro from any electrostatic discharge events that happen while connecting the external equipment.

Figure 5:
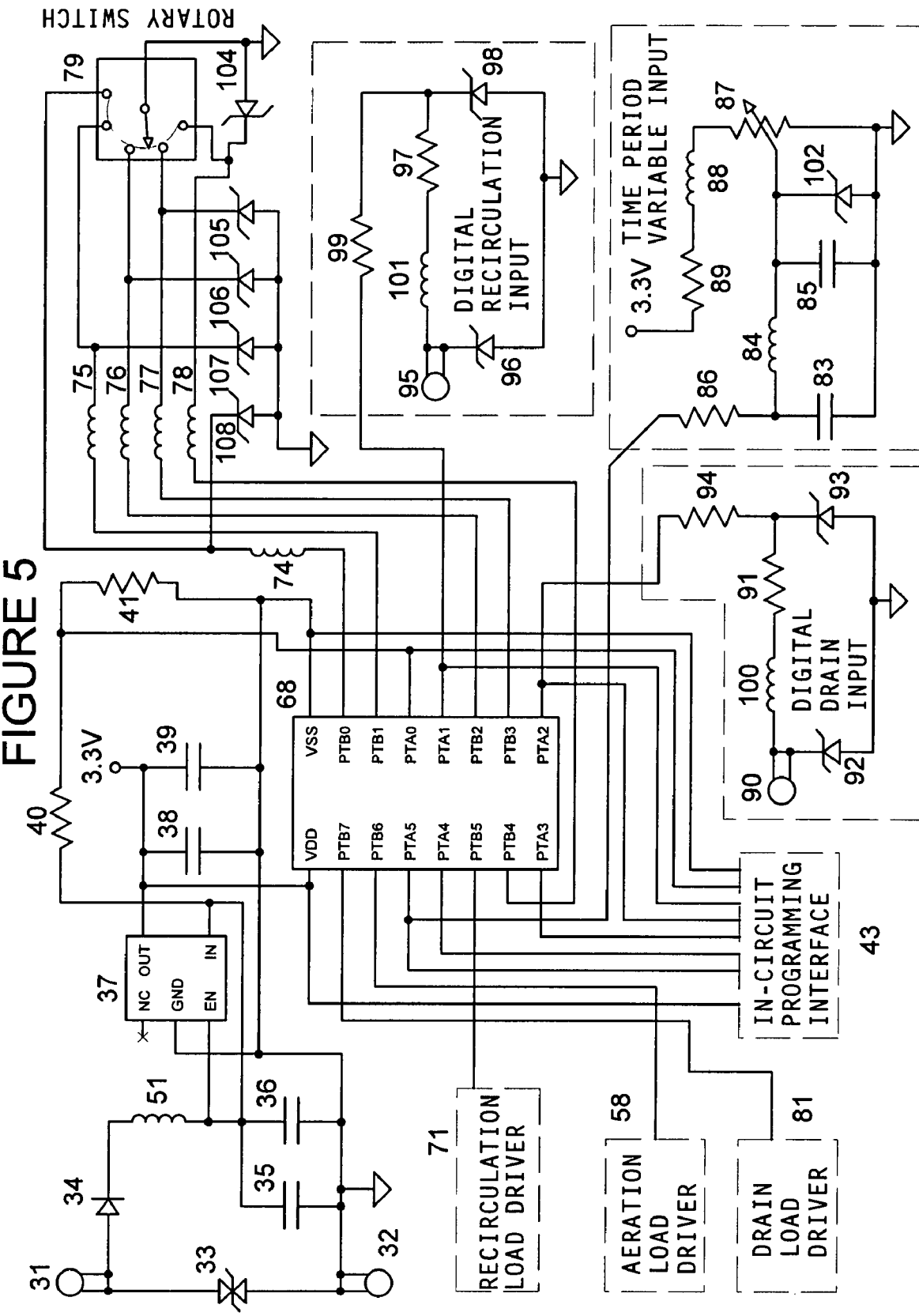
FIG. 5 shows a schematic circuit and system diagram of the system of FIG. 2.

An alternative electromechanical aeration system is shown in part in FIG. 2 with again an associated aeration electrical control system that is here represented in the electrical circuit and system schematic diagram shown in FIG. 5. This electromechanical aeration system operates similarly to the system previously described in connection with FIGS. 1 and 4, but contains additional operating capabilities. This alternative aeration system of FIGS. 2 and 5 is again described as a livewell or baitwell aeration system provided in a suitable vehicle under the control of a commercially available appropriate microcontroller, 68, (the micro) provided in an integrated circuit chip. Here, however, an adjustable fill time is provided for pump 6 in its pumping to initially fill livewell tank 7 that is carried out in performance process block 182, evaluation processes 183 and 184, and decision diamond 185 in FIG. 9 as described above. This adjustable initial fill time requires the user to select an independent fourth time period in the manner described below for this alternative aeration system during which pump operating circuit 58 and pump 6 are switched on as opposed to the previously described system of FIGS. 1 and 4 which had a predetermined fixed tank initial fill time in the controlling of pump 6. This selected initial fill time is detected by the micro at the corresponding I/O ports thereof from where it is converted in the micro into a corresponding stored digital value representing the desired duration for the corresponding system operation time base that is checked by the micro during the initial tank 7 filling process in evaluation block 183.

Figure 2:
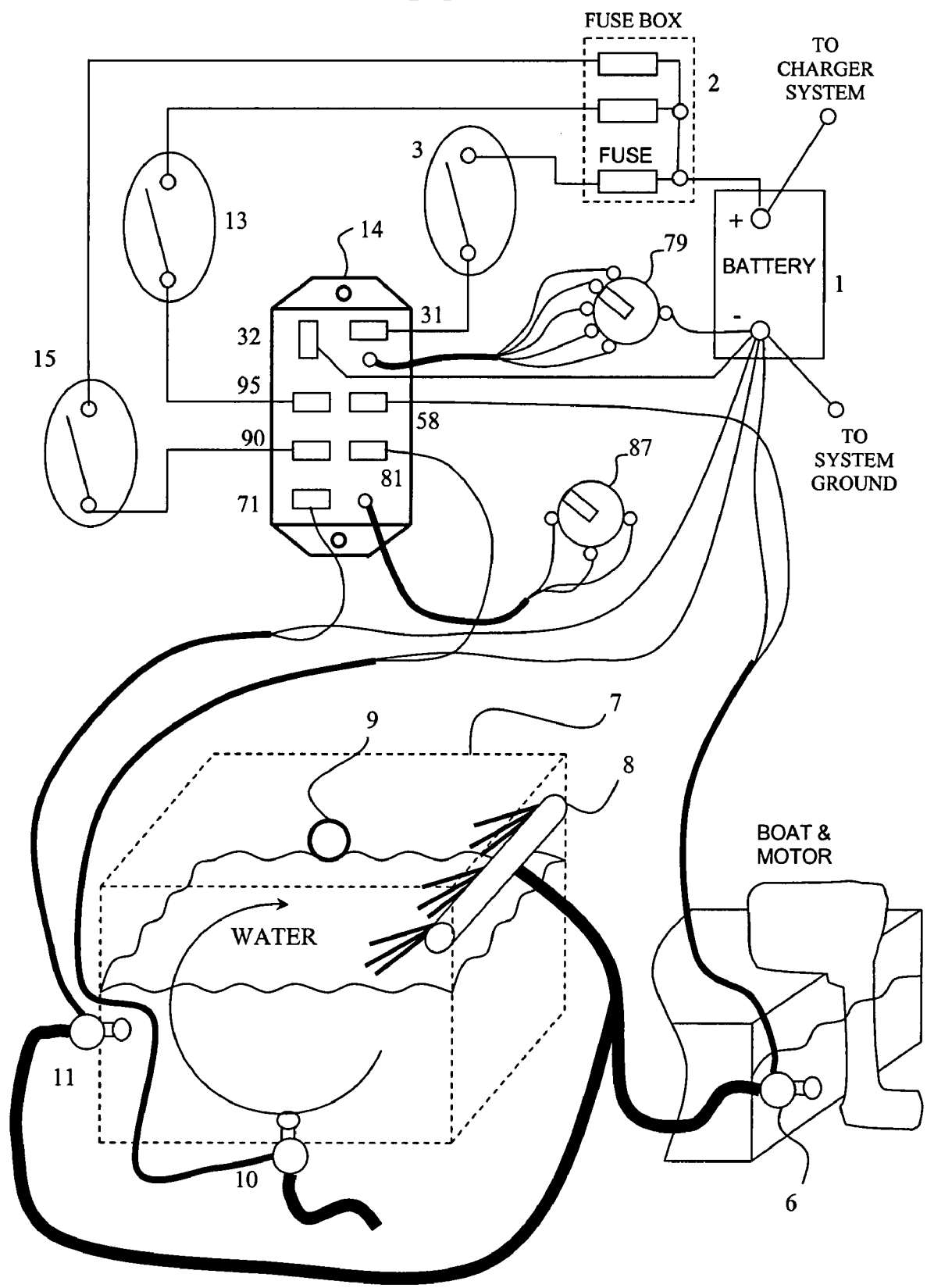
FIG. 2 shows a system electrical components interconnection diagram of an alternative embodiment of the present invention.

Further, this alternative system contains, in addition, a controlled drain valve, 10, as shown in FIG. 2, which was not present in the previously described system, with there being provided an associated adjustable tank drain time control (the "long" drain time) for controlling the activating and deactivating of drain pump 10. Setting the tank drain time requires the user to select an independent fifth time period during which primary aeration pump 6 in FIG. 2 is deactivated and secondary, or drain, pump 10 in FIG. 2 is activated to pump water out of livewell tank 7 so as to completely empty that tank. Tank 7, in the previously described system, relied upon only a manual drain plug 12, which when removed, used gravity to withdraw water from livewell tank 7 to empty it.

Finally, this alternative system of FIGS. 2 and 5 also provides a recirculation mode of operation as an alternative for aerating water in tank 7. This recirculation mode of operation overrides, or takes precedence over, the normal aeration mode based on adding new water drawn from the lake by pump 6 to tank 7 through spraybar 8 with tank water depth being limited by overflow outlet 9. In the recirculation mode of operation, a separate aeration pump, 11, as shown in FIG. 2, is actuated during On cycle times, and deactivated during Off cycle times, in place of normal aeration being provided by pump 6 using new water.

In the recirculation mode of operation, pump 11 withdraws water already in livewell 7 from that livewell and transfers it under pressure to spraybar 8 where it is sprayed out of openings in that bar through some portion of the atmosphere to return it into livewell 7, from where it was drawn, to thereby aerate this tank water. As no additional water is introduced into livewell 7 in this mode of operation, no substantial amount of the water already in tank 7 is expelled through overflow discharge line 9. This recirculation mode operation is typically used when a fisherman has bait or a catch in livewell 7 and wants to provide aeration of the tank water to keep them alive while driving home from the lake.

An altered circuit is shown in FIG. 5 to accommodate incorporating into the alternative aeration system the additional user selectable time settings for the initial fill of tank 7, for drain activation and for recirculation activation, and to control the corresponding activations of pump 6 and of added drain and recirculation pumps 10 and 11. The nominal 12 Volts supplied by system battery 1 is again provided through rocker power switch 3, as the aeration system on and off switch, to system power supply terminals 31 and 32 in a remotely mounted connector arrangement and selector, 14, shown in FIG. 2 and which are again also represented in the schematic diagram of FIG. 5.

The operational control of this alternative aeration system is provided by the micro performing input processes 183, 188, and 196, along with evaluation processes 184, 189 and 197, in FIG. 9. In addition, the micro makes the determination in decision diamond 185 to enter the Off cycle at its initiation point 186, and then makes the determinations in decision diamonds 201, 187 and 190 for operations during the Off cycle as to entering the related performance processes 202 and 203 or to enter the On cycle at the On cycle initiation point 194. The micro further makes the determinations in decision diamonds 204, 195, 198 and 199 for operations during the On cycle as to entering the related performance processes 205 and 206 or to enter again the Off cycle at its initiation point 186. Finally, the micro correspondingly makes the determinations in decision diamonds 187 and 195 as to entering a drain process performance block, 192 (with skips to be described below).

In permitting a user choosing to provide or end recirculation aeration in tank 7, a corresponding one of a pair of alternate value logic level inputs to I/O port PTA1 is selected by the user closing or opening remotely mounted rocker switch 13 to result in recirculation pump 11 activation or deactivation. The closed or open status of recirculation rocker switch 13 is determined by whether or not the 12 Volts of battery 1 supplied through fuse box 2 is present at a terminal, 95, in a remotely mounted connector arrangement, 14, as indicated in FIG. 2, and so whether or not that voltage is present at that same terminal 95 represented in the aeration control system shown in FIG. 5 to thereby select one of two alternative logic level values to be provided at input PTA1 of the micro. The logic level values at micro input PTA1 are obtained from TVS diodes 96, zener diode 98, resistance 97, 99, and ferrite bead inductor 101 as described above for the similar ignition switch status circuit at terminal 57 in the aeration system of FIGS. 1 and 4.

Similarly for a user choosing to drain or stop draining tank 7, a corresponding one of a pair of alternate value logic level inputs to I/O port PTA2 is selected by the user through closing or opening remotely mounted rocker switch 15 to result in drain pump 10 activation or deactivation. The closed or open status of drain rocker switch 15 is determined by whether or not the 12 Volts of battery 1 supplied through fuse box 2 is present at a terminal, 90, in remotely mounted connector arrangement 14, as indicated in FIG. 2, and so whether or not that voltage is present at that same terminal 90 represented in the aeration control system shown in FIG. 5 to thereby select one of two alternative logic level values to be provided at input PTA2 of the micro. The logic level values at micro input PTA2 are obtained from diodes 92 and 93, resistance 91 and 94, and inductor 100 again as described above for the similar ignition switch status circuit at terminal 57 in the aeration system of FIGS. 1 and 4.

The user's selections for the five user adjustable time periods provided in the alternative aeration system of FIGS. 2 and 5 are communicated to the micro on another basis than that used in the previously described aeration system of FIGS. 1 and 4 where a separate potentiometer was provided for each different adjustable time period provided. Here, a "Time Period Variable Input Rotary Switch", 79, is used by the user to select in remotely mounted connector arrangement and selector 14 of FIG. 2 which of the five user adjustable time periods is to be adjusted by that user, and a single potentiometer, 87, is provided to select, again in connector arrangement and selector 14, the duration for the user adjustable time period selected through use of switch 79. Both switch 79 and potentiometer 87 in connector arrangement and selector 14 are typically mounted in a remote location some distance from the rest of the embodiment using a wire harness as are rocker switches 3, 13 and 15 as indicated above. Other kinds of circuits could instead be used in place of a selector switch and potentiometer combination to communicate to the micro a user's selections with respect to the five user adjustable time periods such as using a rotary quadrature encoder switch in place of potentiometer 87, or using a pulse width modulation circuit, or other similar such circuits, that can provide a controlled varying analog voltage, or provide digital pulses, to I/O ports of the micro.

Rotary switch 79 allows the user to select which one of the five user adjustable time periods provided in the alternative aeration system of FIGS. 2 and 5 is to be adjusted through switching to ground a corresponding one of five different I/O ports of the micro through a corresponding one of ferrite beads, 74 to 78. Each I/O port of micro 68 has internal pullup resistors so each corresponding port is normally set to a logic high value. Rotary switch 79 is used to thereby provide a change in logic level values at the I/O input, selected by the user, having a corresponding adjustable time period associated with it. If rotary switch 79 is located within the metal housing for the circuitry shown in FIG. 5, that housing with the close proximity of the circuit components will provide electromagnetic shielding sufficient so that ferrite beads 74 to 78 for filtering high frequency noise due to electromagnetic interference from other electronic equipment connected to system battery 1 are not required in the circuit. Transient voltage suppressers 104 to 108 protect each corresponding micro input from electrostatic discharges and flyback surges resulting from the switchings of, or operation of, other electronic equipment directly connected to those wires contained in the same wiring harness as rotary switch 79.

Once the user has selected which one of the five user adjustable time periods is to be adjusted by selecting the position of the switch terminal contactor in switch 79, the user then selects a time duration therefor by varying the position of the wiper in potentiometer 87 to provide a corresponding varying analog output voltage from 0 to 3.3 Volts through protection circuitry to the micro as an input at its I/O port PTA5 as shown in FIG. 5. This variable analog voltage at I/O port PTA5 of the micro is converted to a corresponding timer register count corresponding to the desired duration in view of the counting of pulses at a frequency derived from the time base oscillator using an analog-to-digital converter (ADC), well known mathematical manipulations, and firmware routines supplied to the micro.

This communication of the wiper setting of potentiometer 87 to the micro occurs in the "Time Period Variable Input" circuit in FIG. 5 by having circuit board power of 3.3 Volts from the output of voltage regulator 37 and capacitors 38 and 39, provided as in the system of FIG. 4, supplied across potentiometer 87 through resistor 89 and ferrite bead 88. Resistor 89 limits the current available from the 3.3 Volt supply in the event of a possible incorrect user installation resulting in a short circuit across system power supply battery 1. The 3.3 Volts so supplied is further filtered by ferrite bead 88 to prevent high frequency electromagnetic interference getting conducted onto circuit board power connections from other electronic equipment connected to system battery 1.

TVS 102 is connected in parallel with the wiper arm of potentiometer 87 to prevent from entering the micro electrostatic discharge or transient voltage surges due to magnetic coupling to the wire harness from nearby electronic equipment or devices. The analog voltage output of potentiometer 87 at that wiper arm passes through a $\pi$ filter to remove any high frequency noise, this filter comprising capacitors 85, 83, and ferrite bead 84. The filtered potentiometer analog output voltage is presented to I/O port PTA5 of the micro through a current limiting resistor, 86, which protects the I/O port from entering a latchup condition caused by excessive current flow due to a transient condition that is present before TVS 102 is able to react by shunting excessive current away from the analog signal. If the "Time Period Variable Input" circuit is located within the metal housing for the circuitry shown in FIG. 5, that housing with the close proximity of the circuit components will provide electromagnetic shielding sufficient so that ferrite beads 84 and 88, and capacitors 83 and 85 for filtering high frequency noise due to electromagnetic interference from other electronic equipment connected to system battery 1 are not required in the circuit.

To initiate a recirculation aeration of tank 7, recirculation switch 13 in the alternative system of FIGS. 2 and 5 is operated by the user to switch operation of the aeration system of FIGS. 2 and 5 from normal replacement water based aeration using pump 6 to recirculation based aeration using pump 11. If the micro is operating this system in an Off cycle at the time of closing switch 13, the micro will continue to perform the Off cycle keeping pump 6 switched off until the micro again reaches decision diamond 201 where the closing of switch 13 will direct it to enter performance process block 203 keeping recirculation pump 11 switched off in accord with being in the Off cycle. So, even if external switch 13 is closed to thereby transmit 12 Volts to input terminal 95, the normal aeration pump 6 and recirculation pump 11 are both off, and control decisions by the micro in the Off cycle carry on as previously described above for the system in FIGS. 1 and 4, except for instead the micro repeatedly going through block 203, and assuming switch 13 remains closed for that remaining duration.

If, however, rocker switch 13 is opened before the end of the Off cycle to thereby remove 12 Volts from terminal 95, the micro will continue to perform the Off cycle keeping pumps 6 and 11 switched off until the micro again reaches decision diamond 201 where this opening of switch 13 will direct it to enter performance block 202 keeping pump 6 off and then proceed to decision diamond 187 to check on the closed or open status of drain rocker switch 15. If switch 15 is still open, the micro proceeds to process input block 188 and from there continues to perform the Off cycle for its remaining duration as previously described above for the system in FIGS. 1 and 4.

If, alternatively, drain switch 15 has been closed by the user to thereby cause 12 Volts to be transmitted to terminal 90, the tank 7 drain cycle will ensue with pump 6 remaining deactivated. Thus, the micro proceeds to a decision diamond, 191, and skips through it because this aeration configuration in FIGS. 2 and 5 does not contain predictive loop control. That is, the micro proceeds to process performance block 192 where drain pump operating circuit 81 and drain pump 10 are switched on, or activated, to thereby start a drain cycle for the corresponding time period previously selected by the user after which time drain pump 10 is deactivated. The micro then proceeds to Shut off process 200 where the aeration system of FIGS. 2 and 5 is disabled and all of the pumps 6, 10, and 11 are switched off until this aeration system is reactivated by the user. To reactivate this system, the user must first switch off device power by opening rocker power switch 3, and thereafter again closing switch 3 to cause the micro to restart at power up reset process 180 in FIG. 9.

If recirculation switch 13 is closed during an On cycle instead of during the Off cycle, the micro will continue to perform the On cycle keeping the water replacement aeration pump 6 switched on until the micro again reaches decision diamond 204 where the closing of switch 13 will direct it to enter performance process block 206. There, pump operating circuit 58 and pump 6 are switched off, or deactivated, and pump operating circuit 71 and recirculation pump 11 are activated for the duration of the On cycle as previously described above for the system in FIGS. 1 and 4, except for instead the micro repeatedly going through block 206, and assuming switch 13 remains closed for that remaining duration.

If, however, rocker switch 13 is opened before the end of the On cycle to thereby remove 12 Volts from terminal 95, the micro will continue to perform the On cycle keeping pump 11 switched on until the micro again reaches decision diamond 204 where this opening of switch 13 will direct it to enter performance block 205 to switch pump operating circuit 58 and pump 6 on. The micro will then proceed to decision diamond 195 to check on the closed or open status of drain rocker switch 15. If switch 15 is still open, the micro proceeds to process input block 196 and from there continues to perform the On cycle for its remaining duration.

If, instead, drain switch 15 has been closed by the user to thereby cause 12 Volts to be transmitted to terminal 90, the tank 7 drain cycle will be undertaken. Thus, the micro proceeds from decision diamond 195 to a decision diamond, 207, and skips through it because this aeration configuration in FIGS. 2 and 5 does not contain predictive loop control. That is, the micro proceeds to another performance block, 210, to there deactivate operating circuit 58 and pump 6. Thereafter, the micro goes to process performance block 192 where drain pump operating circuit 81 and drain pump 10 are switched on, or activated, to thereby start a drain cycle for the corresponding time period previously selected by the user after which time drain pump 10 is deactivated. The micro then proceeds to Shut off process 200 where the aeration system of FIGS. 2 and 5 is disabled and all of the pumps 6, 10, and 11 are switched off until this aeration system is reactivated by the user. To reactivate this system, the user must first switch off device power by opening rocker power switch 3, and thereafter again closing switch 3 to cause the micro to restart at power up reset process 180 in FIG. 9.

Figure 6:
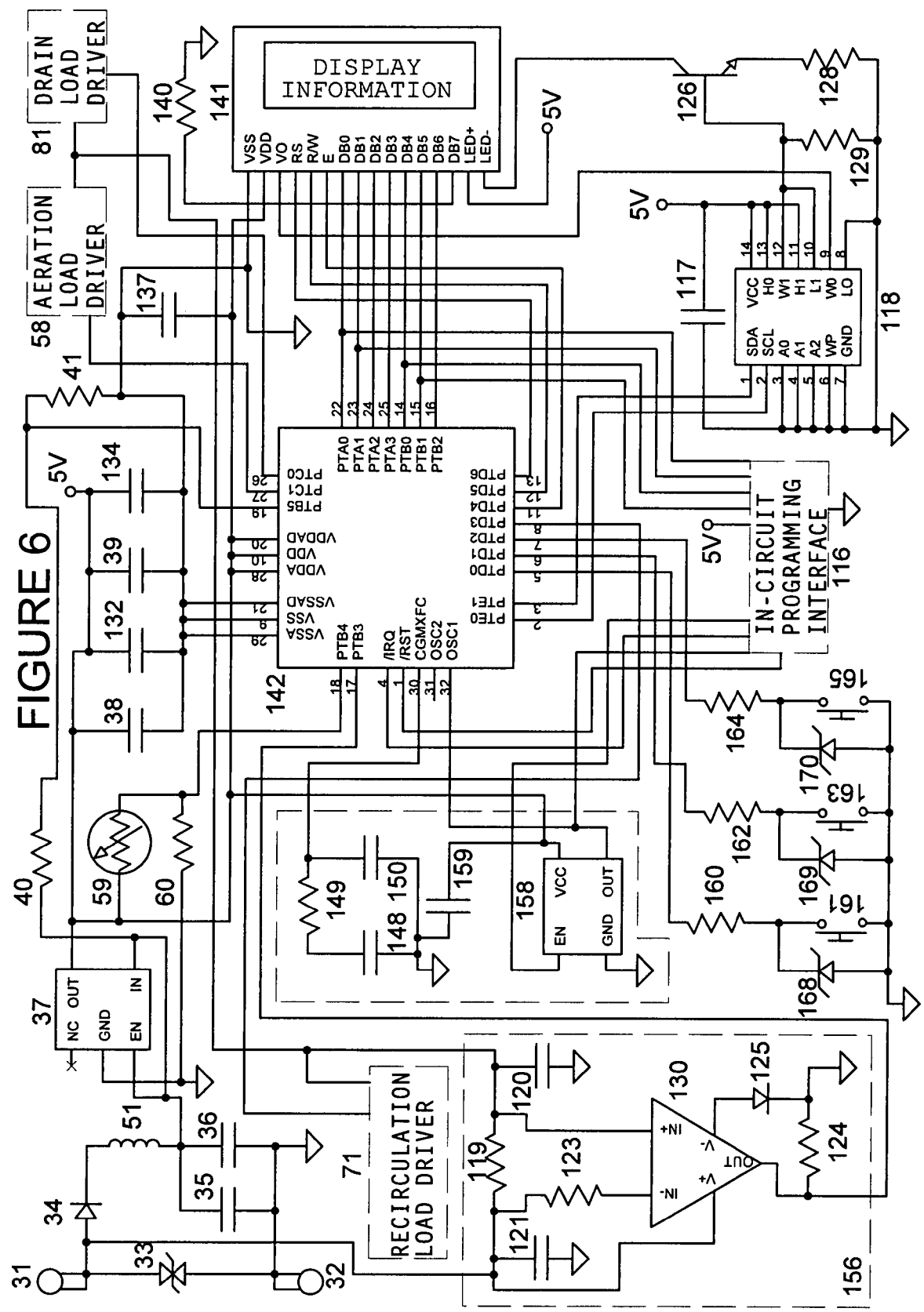
FIG. 6 shows a schematic circuit and system diagram of the system of FIG. 3, FIGS. 7A, 7B, 7C, 7D, 7E and 7F show various actuator subsystem operating circuits.

A further alternative electromechanical aeration system is shown in part in FIG. 3 also again with an associated aeration electrical control system that is here represented in the electrical circuit and system schematic diagram shown in FIG. 6. As seen in FIG. 3, there is again provided livewell pump 6, drain pump 10 and recirculation pump 11 all of which are operated by the control system of FIG. 6. However, additional operational capabilities are provided in the aeration system shown in FIGS. 3 and 6 including providing an information display and a keypad as part of a remotely mounted connector, input selector and display arrangement, 23. This arrangement is provided, in addition to allowing the making of electrical interconnections, as the basis for a user entering operations selection information instead of using individual electromechanical switches and potentiometers and for observing visually displayed information.

Providing such additional capabilities requires more I/O ports in the microcontroller for receiving input signals and providing output signals and, therefore, a more capable commercially available microcontroller, 142, typically provided as an integrated circuit chip or, alternatively, a more capable commercially available integrated circuit chip digital signal processor (DSP) is required for operating the aeration system of FIGS. 3 and 6 (either hereinafter termed a "controller") typically including a nonvolatile memory section. This controller has two additional electrical power supply terminals provided therein along with other additional devices in the circuit, and thus, in addition to capacitors 38 and 39 across the output of voltage regulator 37, a pair of bypass capacitors, 132 and 134, have been added in parallel with capacitors 38 and 39 to supplement providing transient currents as needed and for filtering high frequency noise, directly at the supplemental power pins, with close proximity from VDDA to VSSA and to VDDAD to VSSAD. There has been further provided across the output of voltage regulator 37 a display bypass capacitor, 137, that is also across the power supply terminals of a commercially available information display device, 141. An oscillator bypass capacitor, 159, is also further provided across the power supply terminals of a commercially available integrated circuit chip oscillator, 158, and a digital potentiometer bypass capacitor, 117, is also further provided across the power supply terminals of a commercially available integrated circuit chip digital potentiometer, 118. These capacitors are added to the circuit in parallel to the output of previously mentioned regulator 37 to aid in providing transient current to these devices also and to provide high frequency noise filtering for them.

Figure 3:
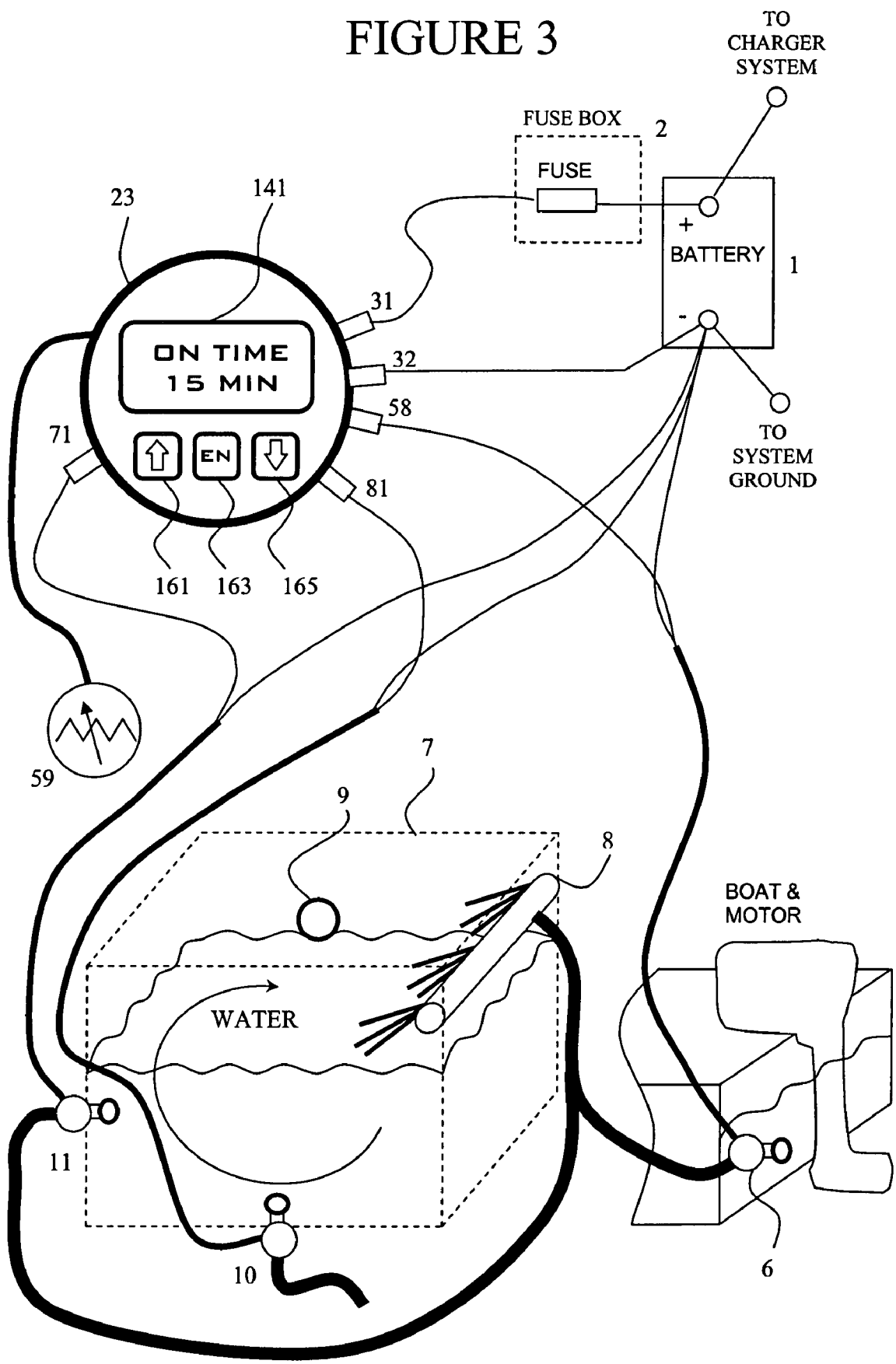
FIG. 3 shows a system electrical components interconnection diagram of a further alternative embodiment of the present invention.

The aeration system of FIGS. 3 and 6 provides predictive loop control of drain operating circuit 81 and drain pump 10 to allow this system to provide a user selected "short" time drain cycle in a performance block, 208, in FIG. 9 (skipped past in previously described aeration system configurations) in an On cycle in which only a fraction of the water is drained from livewell tank 7. As described above, the aeration system typically activates primary aeration pump 6 which draws water from an ambient source, such as a lake, and pumps it under pressure to spraybar 8 where the water is sprayed through some portion of the atmosphere into livewell 7 thereby causing convective circulation in the water in tank 7. In this typical tank water aeration operation, livewell tank 7 is already full to the level of discharge outlet 9. When aeration pump 6 is activated, water in the livewell is circulated causing a portion of the contaminates that normally settle to the bottom of the tank to become suspended in the water to be immediately expelled through tank overflow outlet 9.

While this aeration operation does provide increased oxygen content in the tank water and reduces contamination in livewell 7, some of the newly added tank water is also expelled through outlet 9. Operating tank drain pump 10 for a short duration, instead, results in drawing contaminates along with tank water from the bottom of livewell 7 and forcing them into the ambient lake water source while allowing activated pump 6 to provide more of that ambient lake water in tank 7 with a higher oxygen content as compared to pump 6 acting alone. Pump 6 acting alone serves to suspend in the tank water a portion of the contaminates followed by forcing them and some of the tank water out of overflow outlet 9. Thus, this alternative joint operation of pumps 6 and 10 reduces the amount of newly added ambient "good" water that is expelled and so reduces the amount of water flowing through overflow outlet 9. The "short" drain time for such draining of tank 7 is selected by the user in the same manner as the time durations for other operating cycles in the aeration system of FIGS. 3 and 6. Thus, it is possible for the user to "predict" the time settings for activation of "short" drain time of drain load 10 and for activation of aeration load 6, in such a manner so water flow into livewell tank 7 is approximately equal to water flow out from livewell tank 7, so that no "new" water being pumped from aeration load 6 through spraybar 8, is expelled through tank overflow outlet 9, thus providing improved aeration to livewell tank 7.

This is accomplished by the user through entering data through the keypad in the remotely mounted connector, input selector and display arrangement 23, including in addition to entering time settings also entering the pumping capacities (typically, in gallons per hour or gph) of primary aeration pump 6 and tank drain pump 10 for use in operating the predictive control loop. The "short" drain time is set by the ratio of the pumping capacity of pump 6 to the pumping capacity of pump 10 (as adjusted in the manner described below) times the previously selected On Time. The user is also provided with the opportunity to adjust this ratio by entering an adjustment factor to be applied through multiplying this ratio, the value of this factor based on the user's experience with the user's pumping configuration arrangements used with pumps 6 and 10.

Such an adjustment factor can be needed to compensate for various configuration effects on the volume flows of these pumps during pumping operations thereof because of the natures of the tubing connections peculiar to these pumps in providing them with access to livewell 7, and to the water source and sink, typically a lake on which a boat carrying that livewell is being used. Thus, for example, the drain tube leading from drain pump 10 to the lake could be relatively long and of a "ribbed" surface configuration while the aeration tube leading from the lake to aeration pump 6 is relatively short with a smooth surface configuration resulting in less water flow resistance in the aeration tube relative to the drain tube (assuming the same tube interior diameters which could also differ). Such a difference would lead to a water depth gain in livewell 7 (assuming the same pumping capacity ratings for each of these pumps which could also differ) during predictive loop operation which can be mitigated to the user's desired extent by the user entering an adjustment factor having a selected value less than 1.0. The reverse of the foregoing kinds of tubing configurations used with pumps 6 and 10 would lead to a water depth loss in livewell 7 during predictive loop operation which can be mitigated to the user's desired extent by the user entering an adjustment factor having a selected value greater than 1.0.

Battery 1 remaining charge determinations that are made in operating the aeration system of FIGS. 3 and 6 can be aided by the user entering the battery amp hour rating, and battery type (starting or deep cycle) using the key pad for input as described further below, and choosing to add a temperature sensing voltage divider network, and a load current sensing circuit, 156, to the aeration systems of previous configurations as indicated in the aeration system shown schematically in FIG. 6 and further shown in system FIG. 3. The user is able to enter the battery parameters of amp hour rating and battery type (starting or deep cycle) as further described below to thereby allow the selection of the exact battery discharge curve from the battery manufacturer's published battery data, and making the charge determination calculation more accurately. The temperature sensor is comprised of thermistor 59 and fixed resistor 60. Depending on the location of the sensor, it can be used to measure the ambient air temperature, or be placed directly on the battery to measure battery temperature. Direct placement on battery 1 will provide the most accurate measurement that can be made, however, in many situations, this requires long sensor leads to be extended from the sensor to the controlling circuit as indicated in FIG. 3. In the situation of having long leads connecting thermistor 59 for further connection to resistor 60, a "π" type filter circuit should be added in series with thermistor 59, to shunt high frequency noise to ground from this signal. In most aeration system installations, the ambient air temperature will be measured, requiring short leads for connection of thermistor 59 to resistor 60.

As the measured temperature changes in the medium monitored, the impedance of thermistor 59 changes, causing a resulting analog voltage drop across resistor 60 to change. This changing voltage is presented to the controller pin PTB4 and detected as an analog voltage value by the controller as previously described input processes 183, 188, 196. The remaining state of change (SOC) contained by the battery can, as a result, be adjusted for temperature by multiplying the current state of charge by the new temperature value obtained from manufacturers of batteries suitable as battery 1 or from known battery analysis models. One such analysis model is provided by setting the battery capacity at a temperature T equal to the battery capacity at 25° C. multiplied by the temperature difference of (25° C.–T) and further multiplied by the factor (1−K) where K is a temperature coefficient determined empirically from measuring the discharge characteristics of the kind of battery of interest with known electrical loads. The most accurate remaining SOC can be calculated by measuring both the current being drawn from the battery, during the operation of any combination of the aeration system pumps, and measuring the length of time that pump combination is being operated. This measured data can then be used to determine the SOC instead of approximating the current draws from battery 1 through relying solely on voltage measurements taken during discharges to estimate average battery drain as previously described using alternative configurations shown in the aeration systems of FIGS. 1 and 4 and FIGS. 2 and 5.

To measure current, an amplifier circuit 156 is used as indicated in FIG. 6. Circuit 156 makes use of a commercially available transconductance current amplifier integrated circuit chip, 130, that can be operated with both inputs at voltages above ground potential. A battery current sensing resistor, 119, having a very small resistance value (symbolically, RSENSE) to avoid a large voltage drop thereacross that would otherwise significantly reduce the supplied voltage to the pump operating circuits, is connected between battery output terminal 31 and the power inputs of the various pump operating circuits. One side of resistor 119 is connected to battery 1 voltage supply at terminal 31. The other end of resistor 119 is connected to the "12 V" power input terminals of that one of the circuits in FIG. 7 used as the operating circuit for fill and aeration pump 6 operating circuit 58, for recirculation pump 11 operating circuit 71, and for drain pump 10 operating circuit 81 to thereby be in series with such power inputs of each of those operating circuits.

The small voltage drop (symbolically, VSENSE) across current value indicating resistor 119, as a result of the any of the pumps and operating circuits therefor drawing power supply current from battery 1, is likely to have noise spikes from inrush currents and switching of circuit inductances, such as the pump motors, and these are filtered out by a pair of capacitors, 120 and 121, each connected from a corresponding side of resistor 119 to ground. These capacitors are capable of maintaining small capacitance values at high frequencies. The high potential end of resistor 119, connected to the positive power input terminal 31, is also connected to a corresponding amplifier input resistor 123, having a symbolic resistance value of RIN 123, and the other end of resistor 123 is connected to the −IN terminal of amplifier 130. The lower potential end of resistor 119 is connected directly to the +IN terminal of amplifier 130. A resistor, 124, having a symbolic resistance value of ROUT 124, the amplifier gain setting resistor, is connected from the output of amplifier 130 to ground. A diode, 125, is connected at its anode to the negative power supply pin of current amplifier 130 and at its cathode to system ground, and thereby prevents any destructive reverse direction electrical current in that amplifier in the event the terminals of battery 1 are accidentally connected in reverse from what is shown in FIG. 3, or in the event the user accidentally connects the aeration system represented in FIG. 6 at terminals 31 and 32 thereof in reverse to terminals 32 and 31 in FIG. 3 rather than matching terminals 31 in each to one another, and similarly for terminals 32.

The small voltages VSENSE that develop across resistor 119, as a result of any of pumps 6, 11 or 10 being switched on by microcontroller 142 to thereby draw current therethrough from battery 1, are supplied to the differential inputs of operational transconductance amplifier 130. An internal sense amplifier in the amplifier circuit arrangement in circuit chip 130 forces −IN to have about the same potential as +IN. Connecting an external resistance, RIN 123, between −IN and V+forces a potential across RIN 123 that is the same as the sense voltage VSENSE across RSENSE 119. A corresponding current, VSENSE/RIN 123, will thus flow through RIN 123. The high impedance inputs of the sense amplifier will not conduct this current, so it will flow through an internal PNP bipolar transistor in the amplifier circuit arrangement to the amplifier 130 output pin as IOUT. The output current is transformed into a voltage VOUT across resistor 124 connected between the amplifier 130 output pin and system ground. The output voltage is then VOUT=IOUT·R 124. The output pin of operational transconductance amplifier 130 is connected to A/D converter port PTB3 in controller 142 to allow this controller to detect this voltage VOUT during input processes 183, 188, and 196.

The aeration system of FIGS. 3 and 6 has an external time base provided by oscillator 158 for controller 142 for use in its timing and counting operations. When electrical power is applied to this system by a physical connection to battery 1 through fuse 2, oscillator 158 begins to provide an oscillatory output signal at the terminal thereof marked "OUT" as a fixed frequency time base signal to input terminal OSC1 of controller 142. This controller terminal is connected to an internal phase locked loop (PLL) circuit in that controller which provides a time base therein that is programmable to allow selecting a desired time base frequency through providing a suitable firmware configuration.

If a relatively low frequency oscillator is used for oscillator 158, this PLL is used to multiply the oscillator output signal frequency in the controller, and this use of the PLL then requires providing external components for stabilization thereof. The stabilization circuit is in the form of a "π" type filter circuit having a resistor, 149, with one end connected through a capacitor, 148, to ground, and the other end thereof connected in parallel to controller 142 at its terminal CGMXFC.

If, instead, oscillator 158 is chosen such as to provide an oscillatory output signal of a sufficiently large frequency, the PLL need not be used to multiply that oscillator output signal frequency and so the PLL stabilization components, capacitors 148 and 150 and resistor 149, need not be provided in the circuit of FIG. 6. Other kinds of time base circuits could be used in place of oscillator 158.

Controller 142 performs a power-up reset of itself in starting process therefor of block 180 in FIG. 9 and waits for the time base supplied by oscillator 158 (and perhaps by its internal PLL) to stabilize in frequency. After such time base stabilization is achieved, controller 142 moves from its reset process to initialize its internal registers, memories, and timers in process 181 of FIG. 9 as well as initializing similar kinds of circuits in digital potentiometer 118 and display device 141. As before, controller 142 then proceeds to the tank fill and time accumulation process in block 182 thereby beginning the start time accumulation and the filling of livewell tank 7 with corresponding information thereabout being shown on display device 141. As described above, controller 142 makes the decisions and undertakes the inputs, evaluations and performances processes set for the aeration system of FIGS. 1 and 4, and also incorporating the additional capabilities set for the aeration system of FIGS. 2 and 5, in including the various operations available in those aeration systems in the aeration system of FIGS. 3 and 6.

The availability of these operations in this system thus includes, in connection with user selections, establishing the On cycle time, the recirculation mode, the Off cycle time, the Auto-shut off cycle time, the recirculation cycle time, the drain cycle time, the capacity rating of pump 6, the capacity rating of pump 10, a user selected volume flow adjustment factor for a short drain time, the amp hour rating of the system battery (battery 1), and battery type (starting or deep cycle) for battery 1, for operating the aeration system of FIGS. 3 and 6. In addition, the system of FIGS. 3 and 6 can have a further operation alternatively available of allowing the setting and beginning of an Override time to shorten the earlier entered Auto-shut off cycle time should the user's situation change in such a manner as to lead to not charging battery 1 (for a relatively long time) to thereby free the user from having to repeat some or all of these time establishment entries to effect reentering another Auto-shut off cycle time of a shorter duration. This Override time can be selected to be a short time duration relative to the remaining Auto-shut off cycle time to have the effect of either switching the operation of the aeration system off after a selected delay or immediately. The foregoing system operation selections and time settings are entered into controller 142 in which they are stored in the nonvolatile memory section so that if system power is removed through disconnecting battery 1 (or allowing it to have discharged), or through controller 142 having entered terminal process 200, these user selections and settings are maintained there and so do not have to be reentered to permit system operation to begin again upon restoration of system electrical power.

In the aeration system of FIGS. 3 and 6, however, these user selection possibilities are displayed on display device 141, and the user selects among them by pressing various ones of a set of key switches, 161, 163 and 165, in predetermined required switching sequences for choosing selections with corresponding information being presented on display device 141 to aid the user in using the menus and entering selected time settings. This includes switching this aeration system off by switching off electrical power from battery 1 using these switches.

Switches 161, 163, and 165 are normally open single pole switches, which are connected to controller pins PTD0, PTD1, and PTD2, respectively, through corresponding current limiting resistors, 160, 162, and 164. The controller has corresponding internal input resistors through which currents supplied internally force the logic values at the associated I/O port to be a logic high. When the user interacts with the keypad by actuating one of switches 161, 163 or 165, that switch shorts the input of the controller I/O port to ground through its corresponding current limiting resistor so that a logic low signal is now present at the associated controller I/O pin. This change in logic state in return is sensed by the controller during input processes 183, 188, and 196. TVS zener diodes 168, 169, and 170 are connected in parallel to said switches to short ESD transients to ground allowing a current path away from the controller when static discharge happens when the user is inputting data into the controller via interacting with the keypad by actuating and de-actuating switches 161, 163, and 165. Depending on the electrical characteristics of the controller being used, in some circumstances, resistors 160, 162, and 164 may not be required, and can be omitted from the circuit.

Although the circuit schematic of FIG. 6 shows using discrete switches 161, 163 and 165 as provided by a commercially available keypad to input data to controller 142 concerning various user selections, other user data entry devices such as a touch screen or other similar technology could be implemented in place of a keypad. Thus, the On time, the Off time, the Auto-shut off time, the Tank fill time, the Tank recirculation activation and deactivation, and the Tank drain time are selected by the user in opening and closing switches 161, 163 and 165 provided in some form, and also similarly selecting the desired Display contrast and the Display backlight setting.

That is, the Display contrast desired by the user is selected by a corresponding combination of openings and closings of switches 161, 163 and 165 made by the user which are detected by controller 142 leading it to send a corresponding serial command to the first of two digital potentiometers in digital potentiometer 118. This command directs that first digital potentiometer to provide a corresponding output voltage at terminal W0 in the range of zero to 5.0 V to terminal VO of display device 141 to select a corresponding display screen contrast. Other combinations of openings and closings of switches 161, 163 and 165 lead controller 142 to send other corresponding serial commands to the first of the two digital potentiometers in digital potentiometer 118 directing that first digital potentiometer provide other corresponding output voltages at terminal W0 in the range of zero to 5.0 V to terminal VO of display device 141 to select other corresponding display screen contrast values.

The user desired Display backlight intensity is similarly selected by the user making a corresponding combination of openings and closings of switches 161, 163 and 165 which are detected by controller 142 to lead it to send a corresponding serial command to the second of two digital potentiometers in digital potentiometer 118. This command directs that second digital potentiometer to provide a corresponding output voltage at terminal W1 in the range of zero to 5.0 V across a resistor, 129, connected between that terminal and ground, and with that terminal also connected to the base of an npn bipolar transistor, 126, connected as an emitter-follower in having a further resistor, 128, connected between its emitter and ground. The collector of transistor 126 is connected to terminal LED− of display device 141 to thereby serve as a controlled current sink at that display terminal with the current through the display background lighting device, a light-emitting diode, supplied from the output of voltage regulator 37 connected to terminal LED+ of display device 141. The magnitude of this current drawn by this emitter-follower connected transistor current sink is determined by the display background lighting intensity, and is set by the voltage appearing on terminal W1 as commanded by controller 142 as $v_{w1}/R_{128} = i_{displaylight}$. Other combinations of openings and closings of switches 161, 163 and 165 lead controller 142 to send other corresponding serial commands to the second of the two digital potentiometers in digital potentiometer 118 directing that second digital potentiometer to provide other corresponding output voltages at terminal W1 in the range of zero to 5.0 V to the base of transistor 126 to select other corresponding display screen backlight intensities.

A resistor, 140, connected between terminal DB7 of display device 141 and ground results in a constant small value voltage being present on that terminal, the terminal which controls the appearance or not of the seventh data bit exhibited on display device 141, as the basis to allow programming the desired operational information into display device 141. Display device 141, shown in FIG. 6 as a liquid crystal display, can alternatively be a light-emitting diode display device, a vacuum fluorescent display device, or any other similarly capable display device for displaying at the display surface thereof the various time durations selected by the user, the time remaining in aeration system operating cycles, and other information likely to be useful to the user such as the current date, the current time, and the temperature being measured by thermistor 59. Although the schematic diagram of FIG. 6 shows controller 142 having I/O ports thereof connected to input ports of display device 141 in one-to-one connections, a single or perhaps just a few connections can instead extend between them over which controller 142 transits serial commands to display device 141. As indicated above, various alternative kinds of display devices can be chosen for display device 141 and the alternative interconnection arrangements that can be chosen between the kind of display device selected and controller 142 will be that which is appropriate for the kind of display device chosen in view of the corresponding costs and needed capabilities.

In operation, if controller 142 has the aeration system of FIGS. 3 and 6 performing an On cycle, and the recirculation mode of operation has not been chosen by the user through keypad switches 161, 163 and 165 so that no corresponding indication is detected by controller 142, as determined in decision diamond 204 of FIG. 9, livewell 7 aeration pump operating circuit 58 and pump 6, having been switched on in performance block 205, continues to pump water through spraybar 8 into tank 7 during that cycle. The drain input status is regularly checked during the On cycle in decision diamond 195.

If the user during the On cycle a) selects through keypad switches 161, 163 and 165 draining tank 7 to at least some extent so that this input indication is detected by controller 142 as a result of the checking in decision diamond 195, and the user also has b) selected through keypad switches 161, 163 and 165 to use predictive loop control of drain operating circuit 81 and drain pump 10 to allow this system to provide a user selected "short" drain cycle while pump 6 is still activated as controller 142 determines in decision diamond 207, such a short duration drain cycle is performed in partial drain cycle performance block 208 by having drain pump 10 activated for the user specified "short" period. This provides increased aeration and contamination removal efficiency as indicated above.

If, however, the user has selected tank 7 draining as detected by controller 142 in decision diamond 195 but has not selected to have predictive loop drain activation as detected by controller 142 in decision diamond 207, controller 142 then proceeds to performance block 210 to there deactivate operating circuit 58 and pump 6 and then on to drain process performance block 192 to activate drain operating circuit 81 and drain pump 10 to drain the water from tank 7. Controller 142 maintains the drain cycle with drain pump 10 activated until the user specified "long" drain time has expired. This mode is typically used to drain the entire contents of livewell tank 7 in situations in which the aeration system is in watercraft that the user is removing from the lake with there being no aquatic vertebrates and invertebrates contained in that livewell tank. The aeration system of FIGS. 3 and 6 thereafter has all aeration and drain pumps deactivated, and which cannot be reactivated from arrangement 23, until the user enters another predefined key sequence by interacting with the user interface switches as previously defined at which time controller 142 will perform a power up reset as shown in process 180 of FIG. 9 to reactivate the system.

If, on the other hand, controller 142 has the aeration system of FIGS. 3 and 6 performing an Off cycle, and the recirculation mode of operation has not been chosen by the user through keypad switches 161, 163 and 165 so that no corresponding indication is detected by controller 142, as determined in decision diamond 201 of FIG. 9, livewell 7 aeration pump operating circuit 58 and pump 6, have been switched off in performance block 202. The drain input status is regularly checked during the Off cycle in decision diamond 187.

If the user during the Off cycle a) selects through keypad switches 161, 163 and 165 draining tank 7 to at least some extent so that this input indication is detected by controller 142 as a result of the checking in decision diamond 187, and the user also has b) selected through keypad switches 161, 163 and 165 to use predictive loop control of drain operating circuit 81 and drain pump 10 to allow this system to provide a user selected "short" drain cycle while pump 6 is still activated as controller 142 determines in decision diamond 191, such a short duration drain cycle is delayed until the next On cycle and operating circuit 81 and drain pump 10 remain deactivated until the end of the Off cycle and into the next On cycle. If, however, the user has selected tank 7 draining as detected by controller 142 in decision diamond 187 but has not selected to have predictive loop drain activation as detected by controller 142 in decision diamond 191, controller 142 then proceeds to performance block 192 to activate drain pump operating circuit 81 and drain pump 10 to drain the water from tank 7. Controller 142 maintains the drain cycle with drain pump 10 activated until the user specified "long" drain time has expired. Again, the aeration system of FIGS. 3 and 6 thereafter has all aeration and drain pumps deactivated, and which cannot be reactivated from arrangement 23, until the user enters another predefined key sequence by interacting with the user interface switches as previously defined at which time controller 142 will perform a power up reset as shown in process 180 of FIG. 9 to reactivate the system.

The On cycle and Off cycle alterations for the aeration system of FIGS. 3 and 6 have been described above to continue in the absence of a low voltage indication or the occurrence of the Auto-shut off cycle time expiration following the occurrence of an Auto-shut off cycle initiation condition as checked for by controller 142 in decision diamonds 193 and 198 in FIG. 9. As indicated above, a user's situation may change leading to a desire on the user's part to shorten the Auto-shut off cycle time or to immediately shut off aeration system operation, through entering the corresponding Override time in the controller via the key switches. Such a capability can be provided in this system by operating controller 142 in the manner of the flow chart in FIG. 9 but with the flow chart portion shown in FIG. 10 substituted for each of decision diamonds 193 and 198 in FIG. 9. The user can enter an Auto-shut off Override time period in this user selection possibility that can be displayed on display device 141 through the user select it by pressing various ones of a set of key switches 161, 163 and 165 in the corresponding predetermined required switching sequence for choosing this selection with corresponding information being presented on display device 141. This entering thereby initiates the aeration system of FIGS. 3 and 6 beginning the corresponding operation through this time period to, at the end thereof, switch off electrical power to all of the aeration pumps in the manner indicated in FIG. 10.

Figure 10:
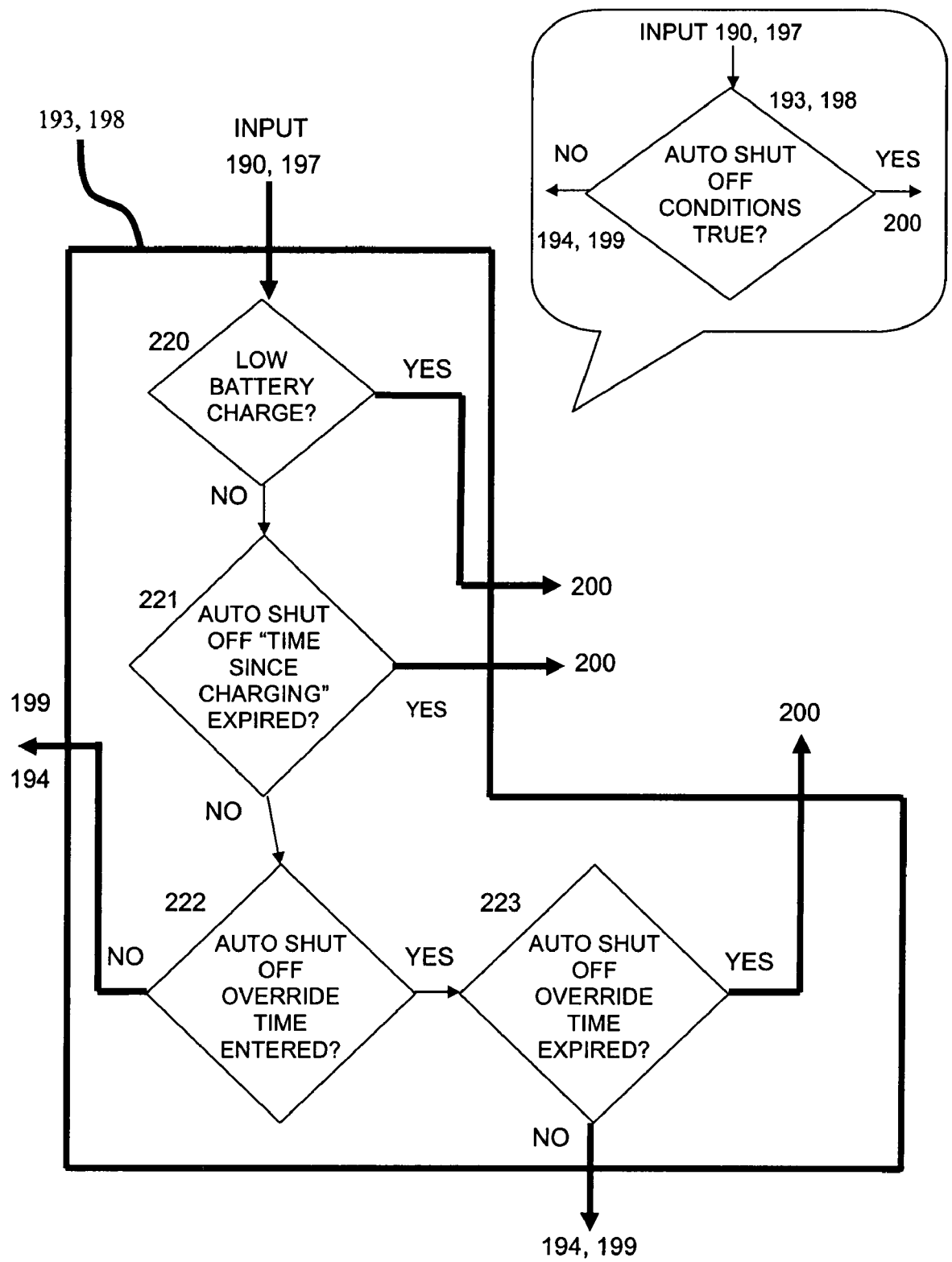
FIG. 10 shows a flow chart portion for substitution of a portion of the flow chart of FIG. 9.

If there is still time remaining in the Auto-shut off cycle time since battery 1 was last determined by controller 142 to be charging, and no low battery charge or voltage is determined thereby to have occurred, in a pair of decision diamonds, 220 and 221, in FIG. 10 entered from decision diamonds 190 and 197 in FIG. 9, which would lead the controller to termination process 200, the controller instead determines in a further decision diamond, 222, whether an Override time has been previously entered by the user through use of key switches 161, 163 and 165.

If no Override time has been entered, controller 142 returns this aeration system to On cycle and Off cycle alterations through decision diamonds 194 or 199 in FIG. 9. If instead an Override time has been entered, controller 142 determines whether this Override time has expired in another decision diamond, 223. If this Override time has expired, the controller enters termination process 200 where the system pumps are disabled and no more On cycles can occur, and which cannot be reactivated from arrangement 23, until the user enters the predefined key sequence causing controller 142 to perform a power up reset as indicated in process 180 of FIG. 9 to reactivate the system. If this Override time instead has not expired, the controller returns this aeration system to On cycle and Off cycle alterations through decision diamonds 194 or 199 in FIG. 9. If no Override time has been entered, and the controller 142 has determined that either the Auto-shut off time has expired, or a low battery charge exists as last determined in decision diamonds 193 or 198 in FIG. 9, the controller then proceeds to termination process 200, where the system pumps are disabled and no more On cycles can occur, and which cannot be reactivated from arrangement 23, until the user enters the predefined key sequence causing controller 142 to perform a power up reset as indicated in process 180 of FIG. 9 to reactivate the system.

An in-circuit programming interface, 116, is shown in FIG. 6, again shown included only as an optional added alternative, that allows connecting to the aeration system of FIGS. 3 and 6 some additional circuit portions shown in FIG. 8B to enable in-circuit programming of controller 142 as described above for the aeration system of FIGS. 1 and 4.

Although the present invention has been described with reference to preferred embodiments, workers skilled in the art will recognize that changes may be made in form and detail without departing from the spirit and scope of the invention.

The invention claimed is:

1. A liquid container aeration system for replenishing gases dissolved in a selected liquid present in an interior of said liquid container, said system comprising:
   an electrically energized liquid pump having an input selectively positionable in a reservoir liquid contained in a selected reservoir similar to said selected liquid and having an output selectively positionable adjacent said interior, said liquid pump being switchable by pump control signals at a pump controller therein between being maintained in a pumping state in which it is capable of pumping a liquid at its input through its output, if electrical power is supplied from an electrical power source to a pump electrode therein, and a quiescent state in which it is incapable of pumping a liquid at its input through its output;

an electrical power consumption detector electrically connected to said pump electrode and capable of determining whether said liquid pump is drawing electrical power through said pump electrode and of providing a power draw detection signal indicating same at a detector output thereof; and a system controller electrically connected to said pump controller and said detector output and capable of determining from said power draw detection signal whether an electrical power source connected in series with said electrical power consumption detector and said pump electrode is in a condition suited to continue supplying electrical power to said liquid pump.

2. The system of claim 1 wherein said electrical power source is a battery and further comprising said system controller being capable of measuring a voltage of an electrical power source connected in series with said liquid pump to provide battery voltage measurement values at selected times, said system controller accumulating a count of periodic pulses from a periodic pulse source beginning after detecting that a said battery voltage measurement value has not exceeded a selected charging voltage threshold.

3. The system of claim 2 wherein said system controller prevents said liquid pump from entering said pumping state upon a sufficient accumulation of counted periodic pulses from a periodic pulse source after a said battery voltage measurement value has not exceeded a selected charging voltage threshold.

4. The system of claim 2 wherein said system controller is capable of acting on a command received thereby to direct said liquid pump to be maintained in said pumping state for a selected period of time despite said system controller otherwise subsequently accumulating sufficient counted periodic pulses from a periodic pulse source after a said battery voltage measurement value has not exceeded a selected charging voltage threshold to prevent said liquid pump from entering said pumping state.

5. The system of claim 1 further comprising said system controller being capable of measuring a voltage of an electrical power source connected in series with said liquid pump at different times to determine a ratio of any changes in that voltage to that resulting difference in those times at which said voltage is measured.

6. The system of claim 5 wherein said electrical power source is a battery and said system controller uses said ratio of change in voltage of a battery connected in series with said electrical power consumption detector to that resulting difference in those times at which said voltage is measured to determine a state of charge of said battery.

7. The system of claim 6 wherein said system controller directs said electrical power consumption detector to measure electrical current drawn by said liquid pump from said battery along with said measuring of said voltage.

8. The system of claim 6 wherein said system controller prevents said liquid pump from being maintained in said pumping state upon determining said battery has an insufficient state of charge to allow said liquid pump to proceed into such a pumping state so as to remain above a selected battery state of charge threshold value.

9. The system of claim 6 wherein said system controller is capable of acting on a command received thereby to direct said liquid pump to being maintained in said pumping state for a selected period of time despite said system controller subsequently determining said battery has an insufficient state of charge to allow said liquid pump to proceed into such a pumping state so as to remain above a selected battery state of charge threshold value to otherwise prevent said liquid pump from entering said pumping state.

10. The system of claim 7 wherein said system controller prevents said liquid pump from being maintained in said pumping state upon determining said battery has an insufficient state of charge to allow said liquid pump to proceed into such a pumping state so as to remain above a selected battery state of charge threshold value.

11. The system of claim 7 wherein said system controller is capable of acting on a command received thereby to direct said liquid pump to being maintained in said pumping state for a selected period of time despite said system controller subsequently determining said battery has an insufficient state of charge to allow said liquid pump to proceed into such a pumping state so as to remain above a selected battery state of charge threshold value to otherwise prevent said liquid pump from entering said pumping state.

12. A liquid container aeration system for replenishing gases dissolved in a selected liquid present in an interior of said liquid container, said system comprising:

an electrically energized injection liquid pump having an input selectively positionable in a reservoir liquid contained in a selected reservoir similar to said selected liquid and having an output selectively positionable adjacent said interior, said injection liquid pump being switchable by pump control signals at an injection pump controller therein between being maintained in a pumping state in which it is capable of pumping a liquid at its input through its output, if electrical power is supplied from an electrical power source to a pump electrode therein, and a quiescent state in which it is incapable of pumping a liquid at its input through its output;

an electrically energized drain liquid pump having an input selectively positionable adjacent said interior and having an output selectively positionable adjacent a drain reservoir, said drain liquid pump being switchable by pump control signals at a drain pump controller therein between being maintained in a pumping state in which it is capable of pumping a liquid at its input through its output, if electrical power is supplied from an electrical power source to a pump electrode therein, and a quiescent state in which it is incapable of pumping a liquid at its input through its output; and a system controller electrically connected to both said injection pump controller and said drain pump controller and capable of acting on a command received thereby to direct said injection liquid pump and said drain liquid pump to each be maintained in said pumping state thereof sufficiently to substitute, for a selected fraction of said selected liquid initially present in said interior of said liquid container, said reservoir liquid sufficient for this said reservoir liquid and that remaining said selected liquid in said interior of said liquid container together provide liquid in said interior of said liquid container to a selected depth.

13. The system of claim 12 further comprising said injection liquid pump having said output thereof comprising a spraybar directed to have said reservoir liquid passing through said injection liquid pump during its being maintained in said pumping state thereof be injected into said interior of said liquid container.

\* \* \* \* \*